(12) United States Patent
Sittig et al.

(10) Patent No.: US 12,425,514 B2
(45) Date of Patent: Sep. 23, 2025

(54) SHARED VISIBILITY OF MULTI-DIMENSIONAL PROFILES AND PREDICTIONS

(71) Applicant: COMMUNITY REINVESTMENT FUND, INC., Minneapolis, MN (US)

(72) Inventors: Heather L. Sittig, Oakland, CA (US); Cory James Moe Slater, Seattle, WA (US); Graham Golder, Fremont, CA (US); Stephen Coller, Seattle, WA (US)

(73) Assignee: Community Reinvestment Fund, Inc., Minneapolis, MN (US)

( * ) Notice: Subject to any disclaimer, the term of this patent is extended or adjusted under 35 U.S.C. 154(b) by 267 days.

(21) Appl. No.: 17/966,695

(22) Filed: Oct. 14, 2022

(65) Prior Publication Data

US 2023/0120032 A1    Apr. 20, 2023

Related U.S. Application Data

(60) Provisional application No. 63/255,950, filed on Oct. 14, 2021.

(51) Int. Cl.
*H04M 3/42* (2006.01)
*H04L 67/306* (2022.01)

(52) U.S. Cl.
CPC ...... *H04M 3/42348* (2013.01); *H04L 67/306* (2013.01)

(58) Field of Classification Search
CPC .. H04M 3/42348; H04L 67/306; H04L 67/75; H04L 67/30; H04L 67/52; H04L 67/50; H04L 9/40; H04W 4/00
See application file for complete search history.

(56) References Cited

U.S. PATENT DOCUMENTS

| 2012/0066104 A1* | 3/2012 | Thalken | G06Q 40/06 705/35 |
| 2016/0267397 A1* | 9/2016 | Carlsson | G06N 3/04 |
| 2017/0024651 A1* | 1/2017 | Mishra | G06Q 30/0201 |

\* cited by examiner

*Primary Examiner* — Kavita Stanley
*Assistant Examiner* — Cecile H Vo
(74) *Attorney, Agent, or Firm* — Perkins Coie LLP

(57) ABSTRACT

Aspects of the present disclosure provide technical solutions embodied in a predictive profiling platform. In example embodiments, the predictive profiling platform is configured to generate multi-dimensional system profiles and predictions thereof, provide shared visibility of system profiles between systems that are mapped together based on relationships between respective users, and enable improved cross-system functionality and operations.

20 Claims, 32 Drawing Sheets

SHARED VISIBILITY OF MULTI-DIMENSIONAL PROFILES AND PREDICTIONS

PRIORITY CLAIMS AND RELATED PATENT APPLICATIONS

This patent document claims the priority to and the benefits of U.S. Provisional Application No. 63/255,950 entitled "FINANCIAL HEALTH EARLY WARNING SYSTEM" filed on Oct. 14, 2021. The entire disclosure of the aforementioned application is hereby incorporated by reference as part of the disclosure of this application.

BACKGROUND

Data input requirements, and in particular structured data inputs requirements along particular dimensions, for various data processes and flows can be obscured and unclear to requesting systems providing the data input. A requesting system may simply dump a large volume of unstructured data and rely upon the data process or flow to implement the sorting, organizing, filtering, and transforming tasks in addition to the base task itself, leading to inefficiencies. Further, network bandwidth is unnecessarily occupied when incomplete data inputs are provided and when resulting errors and responses are communicated back and forth.

Other technical challenges exist with the distribution and visibility of shared data, for example, output data resulting from a data process that is returned to the requesting system. In a service architecture or context, output data is transmitted in a single instance to the requesting system, and visibility and use of the output data is limited to the requesting system. Again, network bandwidth is unnecessarily occupied as the responsibility to share the output data with relevant systems for downstream operations lies upon the requesting system that is now in possession of the output data. In some examples, output data is shared in an inefficient and redundant manner among different systems.

SUMMARY

Example embodiments of the present disclosure address at least the technical challenges identified herein. Embodiments disclosed herein provide a predictive profiling platform that generates multi-dimensional profiles of different systems, devices, or entities based on intelligent and efficient gathering of relevant profile and contextual data. According to various embodiments, the predictive profiling platform further generates predictions of multi-dimensional profiles and shares the profile data and the prediction data among relevant systems, devices, or entities that are identified based on mappings. In some embodiments, the mappings between relevant systems, devices, or entities reflect relationships between respective users associated with each system, device, or entity. Thus, the predictive profiling platform is configured to cause display of relevant and applicable data remotely for different users. In doing so, the predictive profiling platform streamlines cross-system communication and enables improved capability and functionality for cooperating cross-system users.

In one example aspect, a platform configured to interface between a plurality of systems that are mapped to one another is disclosed. The platform includes a profile-management module configured to transmit a request for profile data to a first system. The profile data is configured to characterize a first group of users that are associated with the first system, and the profile data spans a plurality of dimensions. The profile-management module is further configured to, in response to receiving the profile data with respect to at least a first subset of the plurality of dimensions, generate and associate a system profile with the first system.

The platform further includes a system-mapping module configured to define a mapping between the first system and a second system based on detecting a relationship between the first group of users and a second group of users associated with the second system. The platform further includes a contextual-data module configured to retrieve, from one or more external data systems, location-based contextual data related to the profile data with respect to a second subset of the plurality of dimensions. The platform further includes a prediction module configured to generate a predicted system profile that is configured to characterize the first group of users at a future point in time based at least on the system profile and the location-based contextual data.

The platform further includes a shared-visibility module configured to provide coordinated display interfaces at each of the first system and the second system according to the mapping defined by the system-mapping module. Each coordinated display interface includes the predicted system profile for the first system. A first coordinated display interface provided at the first system includes a first set of user functions for which the first group of users are authorized. A second coordinated display interface provided at the second system includes a second set of user functions for which the second group of users are authorized. Both the first coordinated display interface and the second coordinated display interface include a third set of user functions for which both the first group of users and the second group of users are authorized. The platform further includes a function-execution module configured to execute a selected user function based on detecting user interaction with one of the first coordinated display interface at the first system or the second coordinated display interface at the second system.

In another example aspect, a computing system is disclosed. The computing system includes at least one data processor and a memory storing instructions. The instructions, when executed by the at least one data processor, cause the computing system to transmit, to a first device, a request for profile data that is configured to characterize a first group of users associated with the first device. The profile data spans a plurality of dimensions. The instructions further cause the computing system to, in response to receiving the profile data with respect to at least a first subset of the plurality of dimensions, generate and associate a device profile with the first device. The instructions further cause the computing system to define a mapping between the first device and a second device based on detecting a relationship between the first group of users and a second group of users associated with the second device. The instructions further cause the computing system to retrieve, from one or more external data systems, location-based contextual data related to the profile data with respect to a second subset of the plurality of dimensions. The instructions further cause the computing system to generate a predicted device profile that is configured to characterize the first group of users at a future point in time based at least on the device profile and the location-based contextual data.

The instructions further cause the computing system to cause display of a first coordinated display interface at the first device and a second coordinated display interface at the second device according to the mapping. Each of the first coordinated display interface and the second coordinated display interface indicates the predicted device profile for the first device. The first coordinated display interface includes a first set of user functions that are authorized for the first group of users at the first device. The second coordinated display interface includes a second set of user functions that are authorized for the second group of users at the second device. Both of the first coordinated display interface and the second coordinated display interface include a third set of user functions that are authorized for both the first group of users and the second group of users at respective devices. The instructions further cause the computing system to execute a selected user function based on detecting user interaction with one of the first coordinated display interface at the first device or the second coordinated display interface at the second device.

In yet another example aspect, at least one non-transitory computer-readable medium storing executable code is disclosed. The executable code, when executed by at least one data processor, cause the at least one data processor to transmit, to a first device, a request for profile data that is configured to characterize a first group of users associated with the first device. The profile data spans a plurality of dimensions. The executable code further causes the at least one data processor to, in response to receiving the profile data with respect to at least a first subset of the plurality of dimensions, generate and associate a device profile with the first device. The executable code further causes the at least one data processor to define a mapping between the first device and a second device based on detecting a relationship between the first group of users and a second group of users associated with the second device. The executable code further causes the at least one data processor to retrieve, from one or more external data systems, location-based contextual data related to the profile data with respect to a second subset of the plurality of dimensions. The executable code further causes the at least one data processor to generate a predicted device profile that is configured to characterize the first group of users at a future point in time based at least on the device profile and the location-based contextual data.

The executable code further causes the at least one data processor to cause display of a first coordinated display interface at the first device and a second coordinated display interface at the second device according to the mapping. Each of the first coordinated display interface and the second coordinated display interface indicates the predicted device profile for the first device. The first coordinated display interface includes a first set of user functions that are authorized for the first group of users at the first device. The second coordinated display interface includes a second set of user functions that are authorized for the second group of users at the second device. Both of the first coordinated display interface and the second coordinated display interface include a third set of user functions that are authorized for both the first group of users and the second group of users at respective devices. The executable code further causes the at least one data processor to execute a selected user function based on detecting user interaction with one of the first coordinated display interface at the first device or the second coordinated display interface at the second device.

In yet another example aspect, a method is disclosed. The method includes transmitting, to a first device, a request for profile data that is configured to characterize a first group of users associated with the first device. The profile data spans a plurality of dimensions. The method further includes, in response to receiving the profile data with respect to at least a first subset of the plurality of dimensions, generating and associating a device profile with the first device. The method further includes defining a mapping between the first device and a second device based on detecting a relationship between the first group of users and a second group of users associated with the second device. The method further includes retrieving, from one or more external data systems, location-based contextual data related to the profile data with respect to a second subset of the plurality of dimensions. The method further includes generating a predicted device profile that is configured to characterize the first group of users at a future point in time based at least on the device profile and the location-based contextual data.

The method further includes causing display of a first coordinated display interface at the first device and a second coordinated display interface at the second device according to the mapping. Each of the first coordinated display interface and the second coordinated display interface indicates the predicted device profile for the first device. The first coordinated display interface includes a first set of user functions that are authorized for the first group of users at the first device. The second coordinated display interface includes a second set of user functions that are authorized for the second group of users at the second device. Both of the first coordinated display interface and the second coordinated display interface include a third set of user functions that are authorized for both the first group of users and the second group of users at respective devices. The method further includes executing a selected user function based on detecting user interaction with one of the first coordinated display interface at the first device or the second coordinated display interface at the second device.

The above and other aspects and their implementations are described in greater detail in the drawings, the descriptions, and the claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

Figure 1:
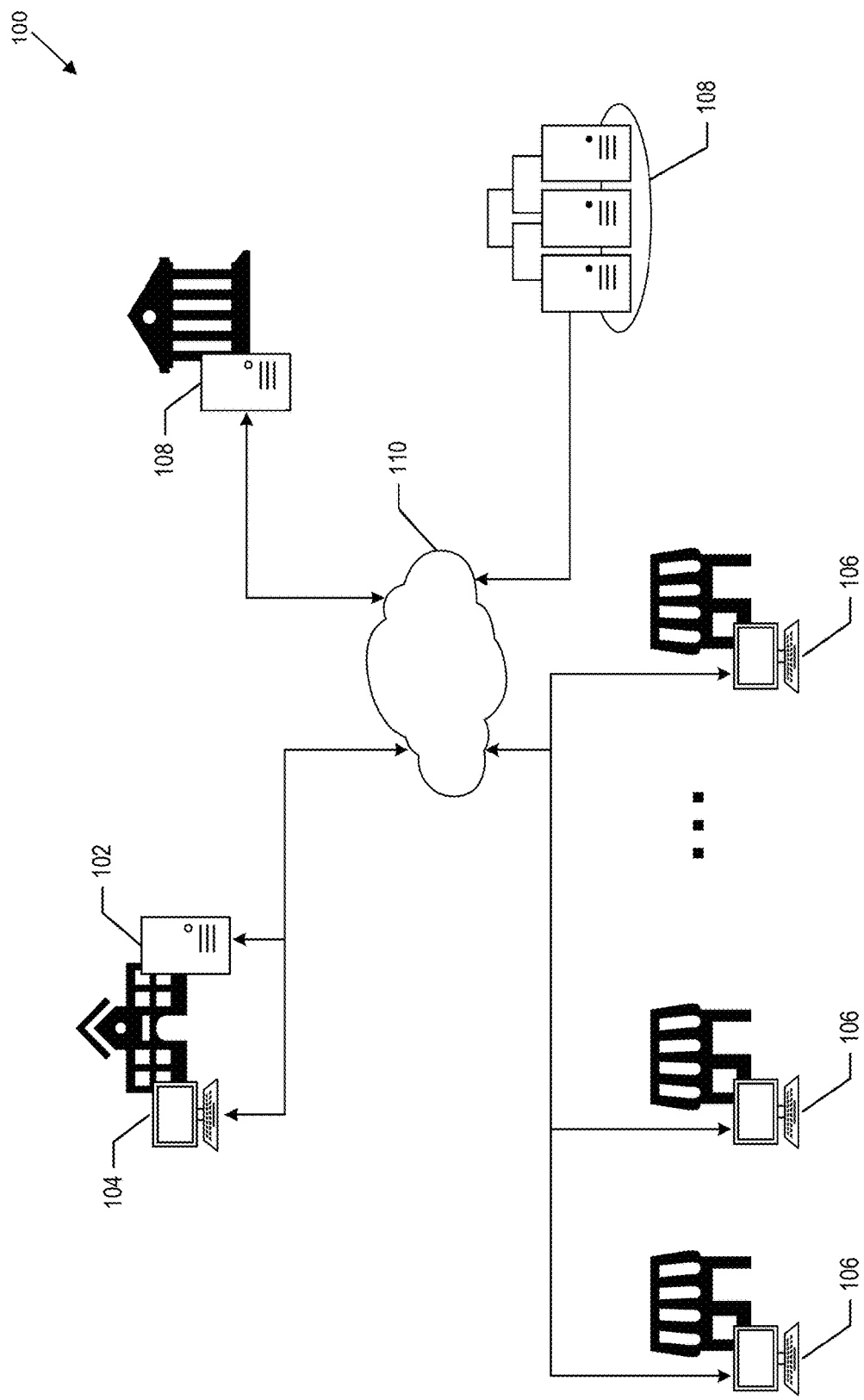
FIG. 1 illustrates a block diagram of an example environment for a predictive profiling platform that provides shared data visibility among different computing systems.

The technologies described herein will become more apparent to those skilled in the field from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to multi-dimensional profiling of user groups or organizations, and predictions with respect to multi-dimensional profiles. The disclosed technology further relates to capturing real-world relationships between user groups based on defining mappings between computing systems. The disclosed technology further relates to providing shared visibility of profile data and prediction data between different systems mapped to each other, and to selectively enabling certain user functions at each of the different systems.

In some embodiments, the disclosed technology involves retrieving contextual data using application programming interfaces (APIs), such as financial account or transaction data. The contextual data is used to create the multi-dimensional profile or snapshot for a given group of users. In some embodiments, the multi-dimensional profile or snapshot is refreshed at a certain frequency (e.g., weekly, monthly).

The multi-dimensional profile or snapshot is used to populate a dashboard or display interface provided to the given user group (e.g., a small- or medium-sized business) such that the users can deeply understand their own state and behavior in multiple dimensions. The multi-dimensional profile or snapshot further populates a dashboard or display interface provided to a related user group (e.g., a support organization that provides support, resources, and/or advice to the given user group), so that both the related user group and the given user group have a shared view of profile data for the given user group. Users of either group can see financial history, historical performance, and/or the like of the given user group. Predictions and forecasting based on previous or historical data are performed and provided in the dashboards to both the given user group and the related user group.

In an example scenario, a catering business is reaching a point of profitability and starting to build up a cash reserve with goals to grow. Users of the catering business and users of a support organization that assists the catering business both can monitor current cash balances of the catering business, and such data is used in comparisons and predictions. Various predictions that are made can be used to guide decisions and downstream operations of the catering business.

Thus, the disclosed technology involves a system or a platform that interacts with users of at least two groups, and the system or platform retrieves profile data and contextual data, performs operations on the profile data and contextual data, and provides the data to users of each of the at least two groups as a shared point of reference for downstream decision making and planning. The performed operations include prediction operations that can serve as an early warning for the users of each of the groups.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

I. Example Environments for Predictive Profiling Platforms

FIG. 1 illustrates an environment 100 in which a predictive profiling platform 102 that is configured to provide shared visibility and to enable coordinated operations between systems is implemented. According to various embodiments, the predictive profiling platform 102 is configured to provide shared visibility of profile and prediction data between multiple systems and to enable coordinated operations between the multiple systems.

In particular, the environment 100 illustrated in FIG. 1 describes a community organization context in which a predictive profiling platform 102 can be implemented. In some embodiments, the predictive profiling platform 102 is implemented by a community entity or support organization that maintains relationships and communicates with different individual organizations throughout the environment 100. For example, the predictive profiling platform 102 is implemented, managed, and operated by a community development financial institution (CDFI). In the environment 100 illustrated in FIG. 1, the predictive profiling platform 102 is used by the community entity or support organization to support and enable other organizations in the environment 100 by generating organization profiles, generate predictions with respect to the organization profiles, providing shared visibility between the support organization and the other organizations on the profiles and predictions, and enabling coordinated or selectively authorized operations by each of the support organization and respective other organizations.

Accordingly, the predictive profiling platform 102 is configured to communicate with a support organization computing system 104 associated with the community entity or support organization. For example, users belonging to the community entity or support organization use the support organization computing system 104 to manage and view information related to the community and other organizations supported by the community entity or support organization and to manage distribution of resources to other organizations. In some embodiments, users of the support organization computing system 104 view, via the shared visibility provided by the predictive profiling platform 102, multi-dimensional profiles and predictions for other organizations that are generated by the predictive profiling platform 102.

On the other end of the shared visibility provided by the predictive profiling platform 102, the environment 100 includes one or more requestor computing systems 106. In some embodiments, the requestor computing systems 106 are associated with the requesting organizations of a community that request support (e.g., physical assets, information resources, financial assets) from the support organization that is associated with the support organization computing system 104. For example, the requesting organizations include small or medium enterprises (SME) or businesses. In the illustrated example, the requesting organizations have a relationship with the community entity or support organization that operates the support organization computing system 104. For example, a requesting organization requests (e.g., via transmissions from the requestor computing system 106) a business loan or grant from the community entity or support organization. As another example, a requesting organization holds an account or resources that are managed by the community entity or support organization (e.g., using the support organization computing system 104). As yet another example, the requesting organization is engaged in a loan or grant from the support organization that is defined by data (e.g., text-based documents) stored by the support organization computing system 104. Thus, a relationship can exist between users associated with the requestor computing system 106 and users associated with the support organization computing system 104.

As illustrated in FIG. 1, the environment 100 further includes one or more external data systems 108. In some embodiments, the predictive profiling platform 102 communicates with the one or more external data systems 108 to obtain relevant data related to requesting organizations, to obtain contextual data (e.g., location data) to enable various profiling and prediction functions, and/or the like. For example, an external data system 108 is implemented by a map provider or geographic data provider, and the predictive profiling platform 102 obtains map or geographic data from the external data system 108 to use for enhanced profiling of and prediction for a requesting organization. As another example, an external data system 108 is implemented by an account managing entity (e.g., financial institution, wholesale supplier, customer/supplier manager), that manages account data relevant to a requesting organization.

Each of the predictive profiling platform 102, the support organization computing system 104, the requestor computing system 106, and external data systems 108 are implemented by one or more computer systems, such as the computing system illustrated in FIG. 7 and described below. According to example embodiments, the one or more computer systems include computing devices, distributed computing devices/systems, cloud computing devices/systems, servers, terminals, personal computers, tablet computers, laptops, desktops, mobile phones, cellular devices, and/or the like. In some embodiments, the support organization computing system 104 and the requestor computing system 106 are implemented by terminals, laptops, desktops, mobile phones, mobile tablets, and/or the like that include user interfaces and displays such that shared visibility of profile data and prediction data is provided to respective users of the support organization computing system 104 and the requestor computing system 106.

Within the environment 100, each of the predictive profiling platform 102, the support organization computing system 104, the requestor computing system 106, and the external data systems 108 communicate with one another via one or more networks 110. In some embodiments, the one or more networks 110 include an ad hoc network, a personal area network (PAN), a local area network (LAN), a wide area network (WAN), a metropolitan area network (MAN), or one or more portions of the Internet or a combination of two or more of these. In some examples, the network 110 includes an intranet (e.g., at least between the support organization computing system 104 and the predictive profiling platform 102). One or more portions of one or more of these networks may be wired or wireless. As an example, one or more components of the environment 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G Long-Term Evolution network, a 5G New Radio network, a 6G network, etc.), or other suitable wireless network or a combination thereof.

II. Example Features of Predictive Profiling Platforms

Figure 2:
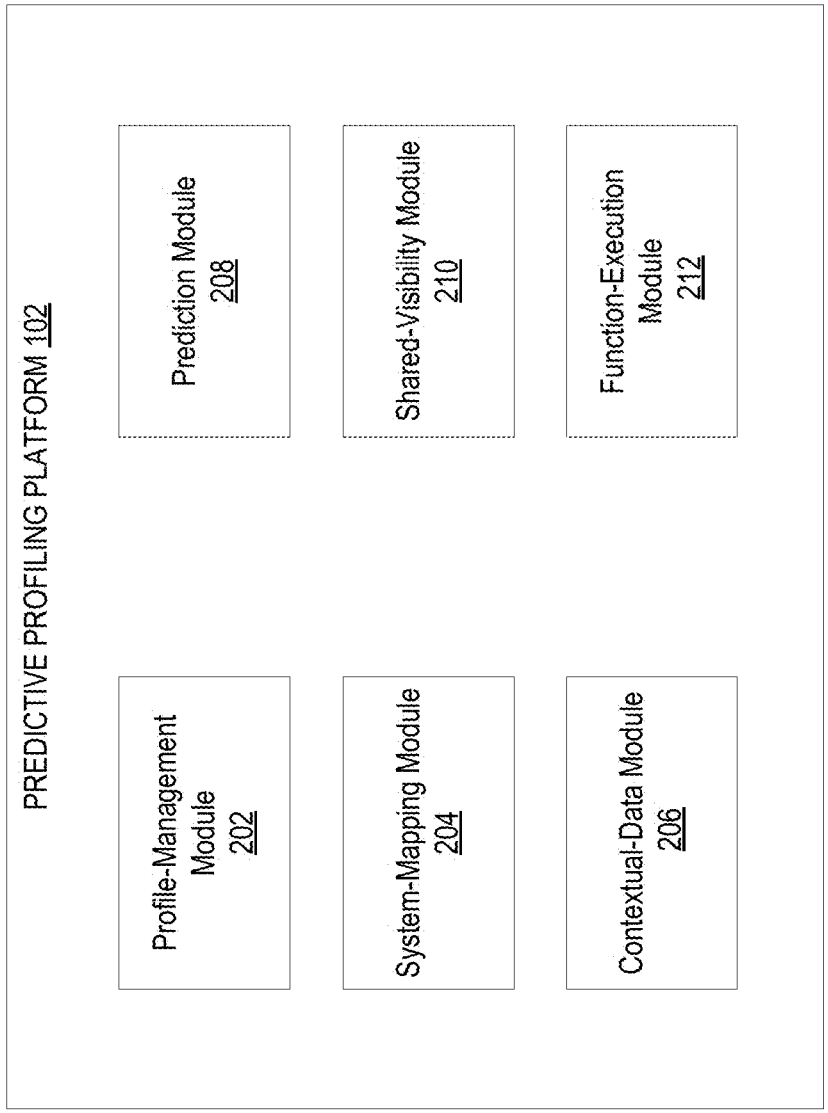
FIG. 2 illustrates a block diagram of an example predictive profiling platform that provides shared data visibility among different computing systems.

FIG. 2 illustrates a block diagram of an example predictive profiling platform 102 configured to provide shared visibility of profile and prediction data between different systems defined by real-world relationships or mappings. In some embodiments, the predictive profiling platform 102 is further configured to enable and facilitate user functions and operations between cooperating respective users of the different systems. As discussed, the predictive profiling platform 102 provides implementations and solutions that address technical challenges related to managing large volumes of input data for predictions, supplementing incomplete input data for predictions, providing shared visibility between multiple systems, and capturing real-world user relationships between systems.

In some embodiments, the platform 102 includes a profile-management module 202. The profile-management module 202 is configured to request data for and create multi-dimensional profiles associated with a requestor computing system 106. The multi-dimensional profiles characterize a state, behavior, and/or the like of the group of users or the organization associated with the requestor computing system 106 (e.g., an SME). For example, the profile-management module 202 is configured to transmit a request for profile data to a requestor computing system 106. The requested profile data characterizes the group of users that are associated with the requestor computing system 106. The requested profile data spans a plurality of dimensions, and transmitting the request includes, in some embodiments, causing display of various fields corresponding to the profile data dimensions to guide users of the requestor computing system 106 in providing the appropriate profile data needed to generate a multi-dimensional profile. For example, the requested profile data includes one or more location dimensions (e.g., where is the SME located, what geographical areas are customers/suppliers of the SME located, what geographical area is relevant to the SME), one or more size dimensions (e.g., how many employees does the SME have, what is the annual revenue of the SME), and/or the like.

The profile-management module 202 is then configured to, in response to receiving the profile data with respect to at least a first subset of the plurality of dimensions, generate and associate a multi-dimensional profile with the requestor computing system 106 (e.g., a system profile). In some examples, the profile data provided by the requestor computing system 106 is incomplete or only spans a subset of the plurality of dimensions. As such, in some embodiments, the profile-management module 202 is configured to automatically supplement and populate the remaining profile data dimensions using metadata associated with the requestor computing system (e.g., an IP address, a network location), using extrapolation or interpolation techniques from the provided profile data, and/or using contextual data provided by a contextual-data module 206 discussed below.

In some embodiments, the platform 102 includes a system-mapping module 204. The system-mapping module 204 is configured to capture and represent real-world relationships between a support organization computing system 104 and a requestor computing system 106 (or between the respective users thereof). For example, the system-mapping module 204 defines a mapping between a support organization computing system 104 and a requestor computing system 106 based on detecting a relationship between a user group/organization/entity associated with the support organization computing system 104 and a user group/organization/entity associated with the requestor computing system 106. In some embodiments, the system-mapping module 204 further defines mappings that describe relationships between a given support organization computing system 104 and multiple requestor computing systems 106. For example, a given CDFI maintains relationships with multiple clients each associated with a requestor computing system 106. Thus, in some embodiments, the system-mapping module 204 defines a mapping network, graph, tree, and/or the like via which requestor computing systems 106 that are related to a given support organization computing system 104 can be identified.

In some examples, the system-mapping module 204 detects a relationship between respective users of two systems based on explicit and coordinated user inputs at each of the two systems. For example, a user at a first system provides an input that uniquely identifies the second system, and a user at the second system provides an input (or a confirmation) that uniquely identifies the first system. In some examples, the system-mapping module 204 detects a relationship between two systems based on a first system transmitting a request to the second system (e.g., a requestor computing system 106 transmitting a loan request message to the support organization computing system 104, a support organization computing system 104 transmitting a loan offer message to the requestor computing system 106). In some examples, the system-mapping module 204 detects a relationship between respective user groups/organizations/entities of two systems based on parsing text data provided by one of said user groups/organizations/entities. For example, a user of an CDFI or a user of a SME uploads a text-based document (e.g., a contract, a loan/grant terms document, a check, a request form) to the platform 102, and the system-mapping module 204 parses the document to detect a relationship between the CDFI and the SME.

In some embodiments, the platform 102 includes a contextual-data module 206. The contextual-data module 206 is configured to obtain contextual data that supplements the profile data for a requestor computing system 106. For example, the contextual-data module 206 retrieves, from one or more external data systems 108, location-based contextual data related to the profile data with respect to a subset of the plurality of dimensions. In some embodiments, the contextual-data module 206 is configured to generate and transmit API queries, requests, or calls to the external data systems.

In some embodiments, the contextual data retrieved by the contextual-data module 206 includes financial account data for the users (e.g., a SME) of the requestor computing system 106. By doing so, effort on the part of said users to obtain the financial account data themselves to provide to the platform 102 is conserved. In some examples, the requestor computing system 106 provides account and authentication information, which is used by the contextual-data module 206 to directly retrieve the financial account data from the source (e.g., a financial institution).

In some embodiments, the contextual data includes location-based contextual data that is relevant to a region, area, or neighborhood in which the requestor computing system 106 is located. For example, such location-based contextual data includes multi-dimensional profiles for other SMEs or other organizations/entities similar to and located near the requestor computing system 106. As another example, such location-based contextual data includes map or geographic data via which distances between the requestor computing system 106 (or associated user group/organization/entity) and other locations can be determined.

In some embodiments, the platform 102 includes a prediction module 208. The prediction module 208 is configured to predict future states, behaviors, and/or the like of the requestor computing system 106 and associated user group/organization/entity. In particular, the prediction module 208 is configured to generate predicted profiles for the requestor computing system 106 that correspond to future points in time. In some embodiments, the prediction module 208 generates the predicted profiles using a current multi-dimensional profile (e.g., generated by the profile-management module 202) and the contextual data (e.g., obtained by the contextual-data module 206). In some embodiments, the prediction module 208 implements various models (e.g., regressive models, analytical models, intelligence models, machine learning models) that are used to generate the predicted profiles.

In some embodiments, the platform 102 includes a shared-visibility module 210. The shared-visibility module 210 is configured to selectively cause display of relevant information at each of the requestor computing system 106 and the support organization computing system 104 that are mapped to each other by the mapping (e.g., defined by the system-mapping module 204). Thus, the shared-visibility module 210 uses the mappings defined by the system-mapping module 204 to control display of information to different systems. In some embodiments, the shared-visibility module 210 causes display of a first coordinated display interface at the requestor computing system 106 and a second coordinated display interface at the support organization computing system 104.

In some embodiments, the shared-visibility module 210 includes the multi-dimensional profile and predicted profiles for the requestor computing system 106 in both the first and the second interfaces. By doing so, users of the support organization computing system 104 are equipped with holistic and comprehensive information relating to the requestor computing system 106 such that the cooperation and user functions by the users of the support organization computing system 104 are supported and facilitated. For example, given display of the multi-dimensional profile for the requestor computing system 106, users at the support organization computing system 104 are equipped to make more informed and efficient decisions on loan requests, resource distributions, and/or the like related to the user group/organization/entity associated with the requestor computing system 106. On the other side, the multi-dimensional profile being displayed at the requestor computing system 106 enables users at the requestor computing system 106 to reach an improved and deeper understanding of the state and behavior of their group/organization/entity.

In some embodiments, the shared-visibility module 210 selectively or discriminatively includes user functions in each of the first coordinated display interface at the requestor computing system 106 and the second coordinated display interface at the support organization computing system 104. Different user functions are authorized for only users of the requestor computing system 106, for only users of the support organization computing system 104, or for both groups of users. For example, a user function of offering particular loan terms is authorized for only users of the support organization computing system 104, while another user function of accepting a loan offer is primarily relevant to and authorized for users of the requestor computing system 106. As another example, a user function of generating a prediction for a specified point in time in the future is authorized for both groups of users. Accordingly, the shared-visibility module 210 includes sets of user functions in each coordinated display interface based on which users are authorized for each user function.

In some embodiments, the platform 102 includes a function-execution module 212. As discussed, the shared-visibility module 210 makes certain user functions available at either one of the requestor computing system 106 and the support organization computing system 104. Responsive to user selection of a user function via a coordinated display interface, the function-execution module 212 executes the selected user function. In some examples, execution of the selected user function involves communication and coordination between at least the requestor computing system 106 and the support organization computing system 104. For example, the selected user function includes transferring resources, assets, capital, and/or the like from the support organization to the requesting organization, and origin and destination repositories or accounts are specified by each of the requestor computing system 106 and the support organization computing system 104. Other various examples of user functions executed by the function-execution module 212 are discussed herein below.

In some embodiments, the platform 102 further includes a trigger module. The trigger module generally establishes and monitors various thresholds specific to dimensions of the multi-dimensional profile and/or to aspects of prediction data. For example, the trigger module establishes and monitors a threshold with respect to a financial account balance included in the multi-dimensional profile for a requestor computing system 106. As another example, the trigger module establishes and monitors a threshold with respect to a predicted number of negative balance days for the next month. Based on monitoring various thresholds, the trigger module is configured to cause indication of an alert at one or both of the coordinated display interfaces. Thus, both groups of users are dynamically and responsively informed on significant developments related to a requesting organization.

As previously discussed, the predictive profiling platform 102 can be implemented in a community context to support and enable coordinated operations between support organizations (e.g., CDFIs, credit unions, lender entities) and requesting organizations (e.g., SMEs). In particular, the predictive profiling platform 102 in such an example context provides various advantages and benefits. For one, the predictive profiling platform 102 enables a support organization to provide access to real-world resources and capital to requesting organizations in an efficient manner. In particular, requests and administration of such real-world resources and capital are efficiently managed, structured, and communicated using the predictive profiling platform 102, and users of a support organization computing system 104 more clearly understand deficiencies and needs of a requesting organization based on multi-dimensional profiling. As another example benefit, the predictive profiling platform 102 streamlines communication channels between respective users of a support organization computing system 104 and a requestor computing system 106 mapped to the support organization. Relevant information is automatically made visible to respective users on either side, and quantified objectives are automatically determined and prioritized from prediction data. Accordingly, less network and communication bandwidth is occupied during engaged communication between respective users of a support organization computing system 104 and a requestor computing system 106. As yet another example benefit, the predictive profiling platform 102 provides robust and holistic predictions related to states and behavior of requesting organizations, and the predictions are trained and made on multi-dimensional data that captures many layers of contexts and variables that affect said states and behavior.

Thus, example embodiments disclosed herein relating to a predictive profiling platform address and reduce difficulties experienced by users of requestor computing systems 106, including owners and managers of SMEs. The below includes frequent questions and concerns asked by users of requestor computing systems 106 that can be directly addressed by the predictive profiling platform 102, thereby precluding a need for the users to expend time and resources to otherwise find answers to these questions.

"What is the growth, stability, saturation, and turnover of the segment in the geogrid?"

"A large, steady contract may stabilize my business, where could I find one?"

"I don't have any global customers, who might I want to target?"

"I know I can beat out the large if I can just get my foot in the door . . . "

"Getting those contracts feels like a secret society—if you're not in the crowd, you don't know where to look"

"I spend a lot of money on ink for my t-shirt printing business, could I be getting a better deal?"

"I only have one supplier of XYZ but I know I should have a back-up . . . ."

"What are the demographics of people who regularly visit my neighborhood, where do they come from?"

"What are they shopping for?"

"How long do they stay and how much do they spend?"

"How has this changed over time?"

"I am deciding where to open a new location. Which other parts of town serve similar customers and are experiencing significant growth?"

"I need industry-specific talent, where do these workers live?"

Example embodiments also address and reduce difficulties experienced by users of support organization computing systems 104, including CDFI users, lenders, and/or the like. The below includes frequent questions asked by users of support organization computing systems 104 that can be directly addressed by the predictive profiling platform, thereby precluding a need for said users to expend time and resources to otherwise find answers to these questions.

"Once my client implemented a marketing plan, did their performance increase relative to other shops in the area?"

"Was my client the only restaurant in the area that experienced a decline in sales last month or did everyone?"

"Did my client end up hiring those salespeople? If so, when and at what compensation and benefits?"

"How does the compensation and commute compare to other jobs in the area?"

"What are the demographics in the neighborhood where the job was created? Is this a high paying job in the area?"

"What are the fixed costs of living in that area? Where is the disposable income likely to be spent?"

"Where are potential green shoots and opportunities?"

"Which areas or segments experience significant turnover and may be facing structural issues?" i.e. unsustainable fixed costs for certain types of businesses (day care, hardware store)

"Which clients are in geogrids and segments with stalling or no growth?"

Thus, the predictive profiling platform 102 is uniquely suited to support and facilitate operations on a side of a support organization computing system 104 and on a side of a requestor computing system 106 mapped to the support organization computing system 104. The predictive profiling platform 102 provides actionable data that is tuned based on hyper-local contexts and environments for a requestor computing system 106, leading to improved operation and management of a requesting organization.

II.(a) Efficient Access to Resources for Requestors
(e.g., Easy, Timely Capital)

In some embodiments, the predictive profiling platform enables dynamic loans, or loans which may be approved quickly. The predictive profiling platform provides proactive loan offers or commitments. Instead of an invite to apply for capital being sent to a requestor computing system 106, an automatic approval for capital can be sent to the requestor computing system 106. Thus, significant communication efforts and time are streamlined. Users at the requestor computing system 106 can accept the proactive loan offers or commitments with one click. Continuous underwriting may be based on information in profile. (e.g., daily view of cash flow, merchant account trends). The predictive profiling platform enables underwriting of no-file/thin-file candidates (e.g., multi-dimensional profiles with data provided for only a small subset of the dimensions) based on a deeper understanding of over-undersaturation and dynamics for a specific location (e.g., sales, growth, stability/turnover, Huff gravity model).

Example external data sources for providing dynamic loans to users at a requestor computing system 106 include credentialed, read-only access to bank accounts, merchant accounts, point-of-sale devices, accounting databases or books. Other example data sources include aggregated, anonymized credit card transaction data.

In some embodiments, the predictive profiling platform enables grants, including dynamic grant applications. Users at a support organization computing system 104 can generate and transmit grant applications to grant providers on behalf of users at a requestor computing system 106 mapped to the support organization computing system 104. Said grant applications use information included in the multi-dimensional profile for the requestor computing system 106, including information used for dynamic loans. Further, the platform easily gathers additional information and context via surveys transmitted to the requestor computing system 106, the surveys configured to obtain information including context, capital needs, and/or the like. Thus, information from the multi-dimensional profile and other additional contextual data may be used for loan/grant applications.

II.(b) Useful and Timely Advice Provided to
Requestors (e.g., Coaching Priorities)

In some embodiments, the platform enables users at a requestor computing system 106 to receive cash flow management advice from support organization users based upon a dynamic and shared view of cash flow related to the requestor computing system 106. The predictive profiling platform monitors financial health of requesting organizations. The predictive profiling platform enables earlier intervention to bolster health and resilience based on monitoring cash buffer days, burn rate, lumpiness, and/or the like. The predictive profiling platform serves more users through the ability to monitor activities of the users. The predictive profiling platform enables support organization users to work with requesting organization users to understand and identify drivers.

The predictive profiling platform signals when new baselines are reached, for example, with respect to cash flow levels, cash buffer, break-even point, profitability point, and/or the like. In response to the signal from the predictive profiling platform, a support organization user can communicate with a requesting organization user if/when to make a big decision (e.g., hiring, owner compensation). The predictive profiling platform signals when cash buffers reaches a low threshold, and a session can be scheduled to identify causes and actions to take. The predictive profiling platform can offer a line of credit to increase a financial buffer or breathing room.

In some embodiments, key metrics and characteristics for financial health include net cash flow over time (e.g., daily/weekly/monthly/quarterly/yearly summary), cash balances (e.g., maximum/average/minimum daily, standard deviation, negative balances per month), cash flow burn rate, number of cash buffer days, and/or other financial health measures (e.g., financial obligations, cash reserves, financial management system, risk planning, cash flow variability planning, insurance, access to credit, sustainable debt load, access to investment capital). In some embodiments, financial health metrics and characteristics are determined for combined accounts or for individual accounts.

In some embodiments, the predictive profiling platform enables users at a requestor computing system 106 to find and secure larger contracts using rich multi-dimensional profiles. The predictive profiling platform offers an ability for users of requestor computing systems 106 to create a multi-dimensional profile based on providing at least some information. The predictive profiling platform showcases depth of purchasing options within that profile according to standards determined based on the profile. The predictive profiling platform enables requesting organizations (e.g., businesses) to grow their unit size at a moment's notice.

In some embodiments, the predictive profiling platform enables users at a requestor computing system 106 to have improved supplier access and selection based on affordability and group buying. The predictive profiling platform determines a recommended and shared list of suppliers for requesting organizations in a particular area. The predictive profiling platform notifies users of a requestor computing system 106 (e.g., business owners) of potential improvements to operations (e.g., saving money, improve turnaround or delivery times) by switching to a new supplier. The predictive profiling platform detects when users of a requestor computing system 106 may be overspending or when the users may be sole-sourcing and at risk of disruption. In response to such a detection, the predictive profiling platform recommends alternatives to consider (e.g., by maintaining or updating database of preferred, local suppliers). The predictive profiling platform facilitates group buying (identify groups of requesting organizations buying from same supplier, for example, via defined mappings). External data sources for supplier access and selection include transaction data (e.g., bank account transactions and memos), survey data, and/or the like.

In some embodiments, the predictive profiling platform uses location intelligence and multi-dimensional profiles that are dynamic over time to provide contextualized and hyper-local advice to users at a requestor computing system 106. The predictive profiling platform understands the target customer of a requesting organization, including demographics and origin of the target customer. Key metrics include age, profession, commute patterns, average transaction size, overall purchasing power, and/or the like. The predictive profiling platform further understands how the target customer changes over time. The predictive profiling platform uses the understanding of the target customer (e.g., a location-based understanding) to inform marketing, products and services, pricing and positioning by users of the requesting organization. External data sources for location intelligence and understanding target customers include transaction data (e.g., aggregated and anonymized credit card data), traffic data (e.g., aggregated and anonymized foot traffic data retrieved from data providers such as Safegraph or Streetlight, average annual daily traffic data, commuter origin/destination data such as Longitudinal Employer-Household Dynamics Origin-Destination Employment Statistics (LODES)), and/or the like.

In some embodiments, the predictive profiling platform enables users at a requestor computing system 106 to consider expansion using site selection and/or a ranked view of possible sites. The predictive profiling platform understands dynamics of existing successful locations. The predictive profiling platform compares locations against current stores to understand viable sites for expansion. The predictive profiling platform considers key factors including problematic locations with significant turnover, changes in rental expenses, estimated utilities and fixed costs (e.g., IT, insurance), access to talent, supply/demand, and/or the like. External data sources used for expansion functions include transaction data.

In some embodiments, the predictive profiling platform provides demand forecasting (e.g., localized sales benchmarks and forecasts) for users at a requestor computing system 106. The predictive profiling platform understands the causes of fluctuations in demand. In some embodiments, the predictive profiling platform anticipates impact of scheduled events (e.g., parades, festivals, concerts, sporting events) and unscheduled events (e.g., natural disasters, pandemic lockdowns). In some embodiments, the predictive profiling platform informs and optimizes inventory, staffing, & pricing decisions. External data sources used for demand forecasting include transaction data.

II.(c) Value Measurement for Support Users (e.g., Outcome and Impact Reporting)

In some embodiments, the predictive profiling platform assesses requesting organizations related to a given support organization, for example, which are defined as a client portfolio for the given support organization. The predictive profiling platform improves understanding of performance of requesting organizations both on an absolute basis and a relative basis (e.g., compared across organization type or industry, compared to similar organizations located nearby). In some embodiments, performance can be described by multi-dimensional profiles for individual requesting organizations, and other portfolio or aggregated performance measures can be determined from multiple multi-dimensional profiles.

For example, performance can include cash flow or financial health information. Cash flow and financial health dimensions of a multi-dimensional profile for a requestor computing system 106 include current cash balance, baseline balance and stability (e.g., average and variation over a time period, such as a past year), number of cash buffer days or length of cash runway, projected/predicted/extrapolated changes for a time period.

Performance on a relative basis, or performance benchmarking, can refer to characterizing performance relative to economic performance in a geographic area based on recent and relevant industry sales data. As such, performance of a given requesting organization is benchmarked on a hyper-local or specific scale. Thus, location-dependent dimensions of a profile for a given SME can describe whether the SME is performing and growing as fast as or less than other similar organizations/entities in a relevant area or region.

By combining these datasets, signals may be detected, and thresholds may be set to anticipate issues ahead of time. This enables early intervention (e.g., certain intervention events automatically triggered). Example thresholds can be set with respect to financial aspects, such as cash buffer days, burn rate, and/or the like.

The probability of a successful intervention is raised through individualizing and contextualizing them for the specific requesting organization, for example, to obtain a multi-dimensional understanding of the current state and trajectory of the specific requesting organization.

Setting goals for individual requesting organization is enabled, as well as detection of goals and new levels being reached (e.g., hiring someone, paying themselves a salary). These goals serve as a quantitative key performance indicator (KPIs) whose progress can be tracked. Further, these goals support users of a requesting organization in knowing when to make certain decisions.

Contextual data (e.g., local commerce data) is used to supplement and underwrite profiles in which only a small subset of dimensions of data are provided (e.g., thin or no-file organizations/entities).

In some embodiments, the predictive profiling platform provides an alternative, forward-looking credit scoring system. Improved credit metrics may quantify the long term stability of businesses and the resilience of their local communities, as a proxy for estimating the long-term outcome of credit allocation.

In some embodiments, the predictive profiling platform measures a current and/or predicted impact of a requesting organization, such as with respect to job creation in a community, wealth, and access to resources. The predictive profiling platform measures impact in an automated, quantifiable manner. For example, the predictive profiling platform verifies impact via contextual data retrieved from external data systems 108, such that self-disclosure methods (that may include self-biases) like surveys are not relied upon. Impact measurement is focused on the underlying data obtained by the platform to offer services and resources to requesting organizations. The predictive profiling platform makes predictions and inferences about impact. The predictive profiling platform provides dynamic impact reporting, which includes information describing what is currently happening (current state), what has been successful, and what has not been successful. That is, significance or contributing factors within a multi-dimensional profile can be identified, and a feedback loop can be established. Example information or factors can include wealth creation metrics (e.g., increases in financial account balances) and job creation metrics (e.g., increases in employees and compensation expenses). The predictive profiling platform further determines a historical impact of a requesting organization that indicates uniqueness or significance compared to other relevant organizations located nearby, major milestones and inflection points in their history, interactions with key partners, relative or benchmarked performance, and/or the like.

In some embodiments, the profile-management module 302 includes historical data or a timeline in the multi-dimensional profile for a requestor computing system 106. By doing so, example historical data portions of the multi-dimensional profile creates and provides a longitudinal view of a requesting organization's state over time. For example, the multi-dimensional profile includes timepoints, a timeline, and/or a timescale that describes when the requesting organization launched/originated, became loan ready, received a loan, implemented a marketing plan, acquired real estate, repaid a loan, participated in an incubator, completed a business assessment, and/or the like. In some embodiments, a historical timeline of a given multi-dimensional profile can be compared with other historical timelines of other profiles, such as those profiles of similar organizations/entities located nearby. By doing so, outperformance or comparison metrics can be determined on a time basis (e.g., a monthly basis, a daily basis).

In some embodiments, impact measurements for a requesting organization are shared by the predictive profiling platform and/or by the support organization computing system 104 with various third party systems, such as computing systems associated with potential funders. The multi-dimensional profile and impact measurements related to a requesting organization can unlock funds for the support organization and the requesting organization, as well as larger sales opportunities for the requesting organization. Example third parties include capital providers (e.g., lenders, grant providers, etc.) and contract providers (alongside other information that showcases depth of purchasing options within that profile). Multi-dimensional profiles provide a view of organizations and entities along different dimensions including time, quality, and context (or location). Information provided by the system may open an aperture for capital providers and contract providers to lean into requesting organizations. This allows users at requestor computing systems 106 to focus on jobs (compensation, health care, retirement, paid leave, commute) and wealth (improved profits, owner compensation, pay increases).

II.(d) Localized Understanding for Support Users

In some embodiments, the predictive profiling platform enables support organization users to identify green shoots, or areas and segments doing well. The predictive profiling platform identifies geogrids, segments, and/or industries experiencing increased sales, volume, ticket size/frequency growth using contextual data, such as aggregated and anonymized financial transactions.

Similarly, the predictive profiling platform detects distressed areas, or areas, segments, and/or industries with low or no growth, high turnover, and unexpected offline time. The predictive profiling platform identifies requesting organizations that may be facing or on the cusp of becoming financially distressed. Potential signals for identifying such requesting organizations include an organization being located in geogrids and segments with low/no growth, high-turnover (suggesting a dysfunctional infrastructure), the organization experiencing unexpected offline time (e.g., no transactions within last 48 hours), local pockets of businesses experiencing unexpected offline time, and/or the like. Example contextual data used for detecting green shoots and/or distressed areas include transaction data.

In some embodiments, the predictive profiling platform determines interdependencies of areas and access to critical resources. The predictive profiling platform measures the level of access to critical resources, in terms of physical access and financial access for example. For example, the predictive profiling platform considers whether parents in this area have access to the childcare they need in order to generate enough income to live in the area. This leads to a prioritized set of interventions and investments based on the level of impact for the community on access to critical resources. Thus, the predictive profiling platform broadly is suited to improve a community's capacity to absorb and adapt to adverse economic and environmental events.

II.(e) Example Contextual Data

In general, external data sources used by the predictive profiling platform include: American Community Survey, Origin-Destination Employment Statistics (LODES), consumer spending data, business information data, Residence Area-Workplace Distance, Annual Average Daily Traffic (AADT), COVID-19 statistics, foot traffic data, partnerships, and/or the like.

III. Example Operations of Predictive Profiling Platforms

Figure 3:
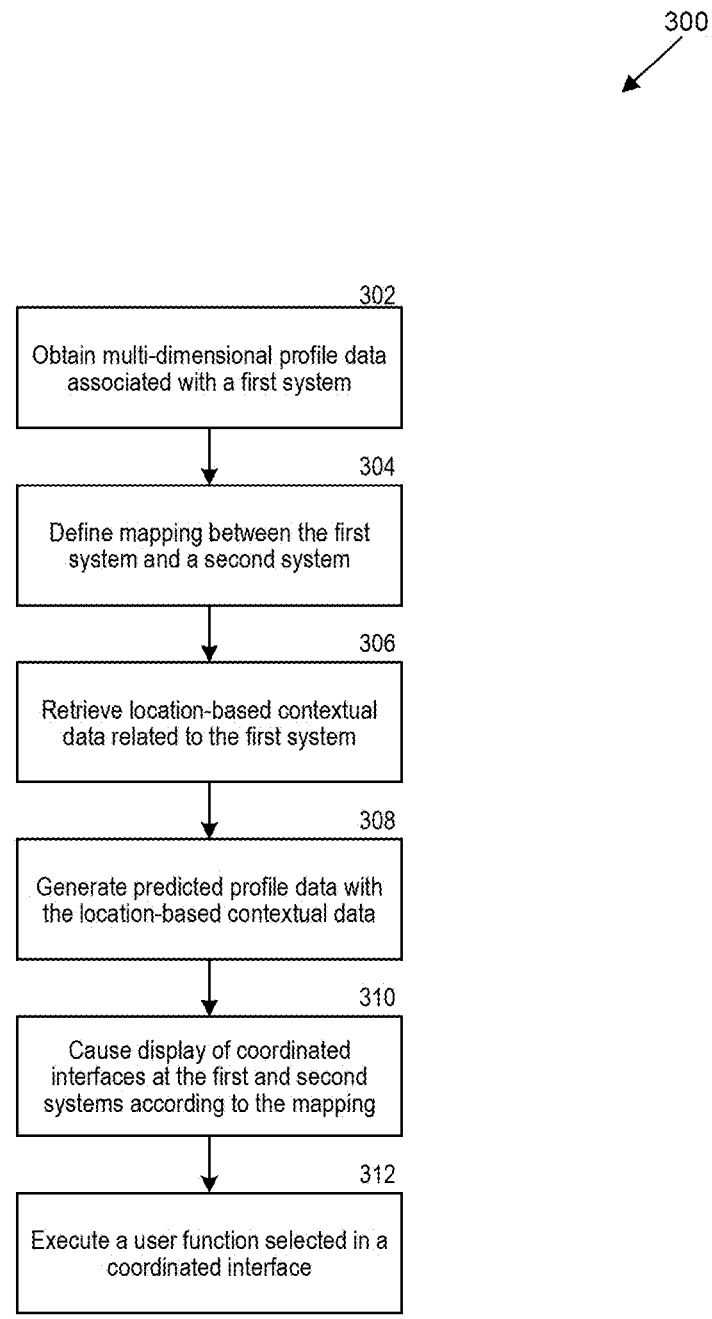
FIG. 3 is a flowchart that illustrates example operations relating to a predictive profiling platform that provides shared data visibility among different computing systems.

FIG. 3 illustrates a flowchart 300 of example operations implemented by a predictive profiling platform 102. In particular, the predictive profiling platform 102 performs the example operations illustrated in FIG. 3 to generate multi-dimensional holistic predictions related to a contextual state of an organization (e.g., a group of users), to provide shared visibility of profile and prediction data of the organization at multiple systems mapped to each other, and to enable and facilitate coordinated or selectively authorized operations that involve at least one of the multiple systems. With the example operations, display interfaces provided at each of multiple systems mapped to each other based on relationships between respective users (e.g., respective organizations or entities operating each system).

At 302, the predictive profiling platform obtains profile data that spans a plurality of dimensions and characterizes a first group of users associated with a first system or device. For example, the platform transmits a request for profile data and receives profile data for at least some of the plurality of dimensions.

At 304, the predictive profiling platform defines a mapping between the first system and a second system or device. In some embodiments, the mapping represents a relationship between respective users of the first system and the second system.

At 306, the predictive profiling platform retrieves location-based contextual data related to the profile data. In some embodiments, the location-based contextual data can supplement the profile data received for only some of the plurality of dimensions.

At 308, the predictive profiling platform generates a predicted profile for the first group of users based on the profile data and the location-based contextual data. In some embodiments, the predicted profile includes financial health indicators and predictions thereof.

At 310, the predictive profiling platform causes display of coordinated display interfaces at each of the first system and the second system according to the mapping. Both coordinated display interfaces include the profile data and the predicted profile data. In some embodiments, the coordinated display interfaces each include some user functions selectively authorized for respective users at the first system, at the second system, or at either system.

At 312, the predictive profiling platform executes a selected user function included in the coordinated display interfaces.

The following describes eleven example user functions. As discussed, a given user function can be authorized for users of a requesting organization (e.g., a SME), for users of a support organization (e.g., a CDFI), or for both. Based on example embodiments discussed herein, these example user functions are enabled, improved, and facilitated by a predictive profiling platform. In some embodiments, each of the example user functions can be indicated as an interactable feature (e.g., a button, a control) in a coordinated display interface, and user interaction with an interactable feature triggers execution of the corresponding user function.

User Function 1: Increase Sales

An example user function enables users at a requestor computing system 106 to improve their ability to proactively identify and engage institutional clients and infer needs for products and services. For example, the example user function informs users belonging to a sanitization business or organization that certain hospitals in a nearby area need sanitization services. In some embodiments, the user function executed by the platform indicates which organizations or entities in an area are looking for goods and services provided by the users at the requestor computing system 106 and can be pursued. Additional parameters and attributes (e.g., women- or minority-owned, skills and certifications) can be used to filter such indications. In some embodiments, the user function implements a matching function using multi-dimensional profiles for the requestor computing system 106 and other organizations in need.

Figure 4A:
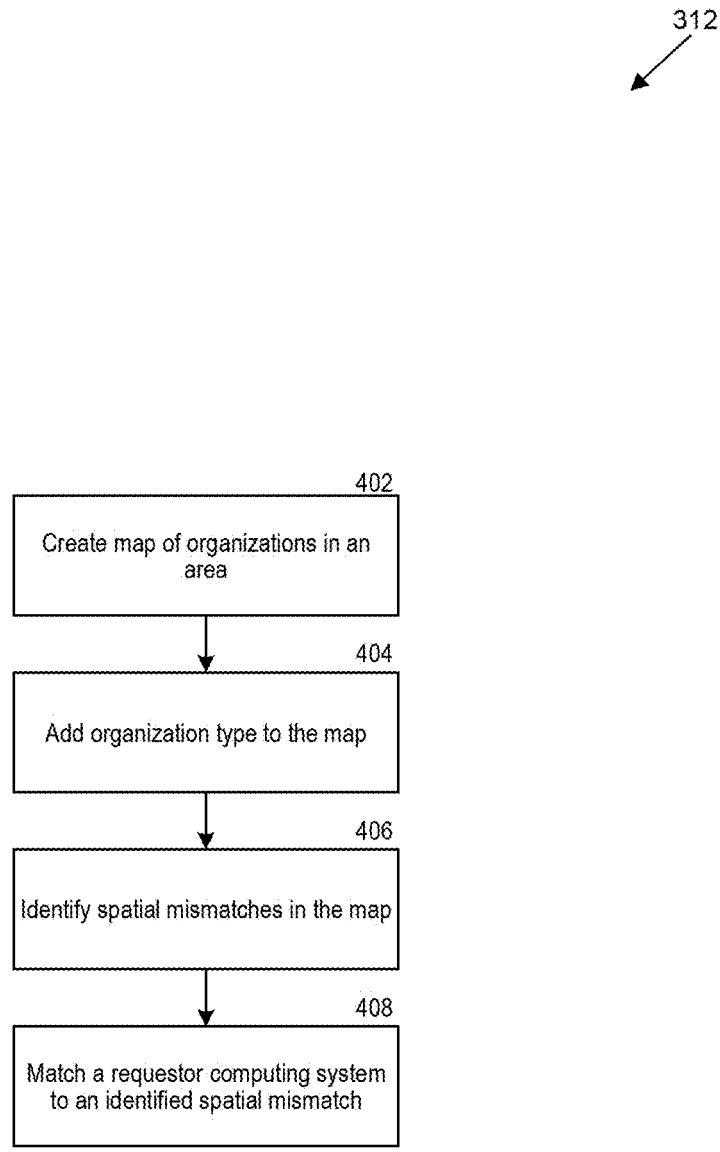
FIG. 4A-4F are flowcharts that illustrate example operations relating to user functions facilitated by shared data visibility and other technical benefits of an example predictive profiling platform.

FIG. 4A illustrates a flowchart of example operations related to improving ability to proactively identify and engage institutional clients. In some embodiments, at least the function-execution module 212 of the platform 102 performs the example operations. At 402, the platform 102 creates a map of organizations in an area. In particular, the map describes supply and demand of products and services in the area. The organizations include the organization associated with the requestor computing system 106. At 404, the platform 102 adds organization types to the map. For example, an organization's business or industry is used to determine specific types of needs for products and services. At 406, the platform 102 identifies spatial mismatches (e.g., non-uniformities, peaks, concentrations) in the map. For example, a concentrated demand for a certain product or a concentration of certain organization types in an area is identified. At 408, the platform 102 matches the requestor computing system 106 to a spatial mismatch according to the multi-dimensional profile for the requestor computing system 106. In particular, the platform 102 matches the requestor computing system 106 to the organizations located within the spatial mismatch. For example, a matching function is performed to connect the requestor computing system 106, whose organization provides a certain product or service, to other organizations in the spatial mismatch who have a need for the certain product or service.

In some embodiments, the platform 102 further facilitates contracting between the users of the requestor computing system 106 and the other organizations in the spatial mismatch. For example, the platform 102 generates and transmits a template contract to at least the requestor computing system 106.

User Function 2: Grow Customer Base

An example user function enables users at a requestor computing system 106 (e.g., a business owner) to improve their ability to find areas of opportunity for expansion and new customers by benchmarking locations against demographics of current successful locations. With the example user function, the users can obtain answers to questions like "My current store does great because of weekend walk-ins, which areas offer access to a similar customer base?"

Figure 4B:
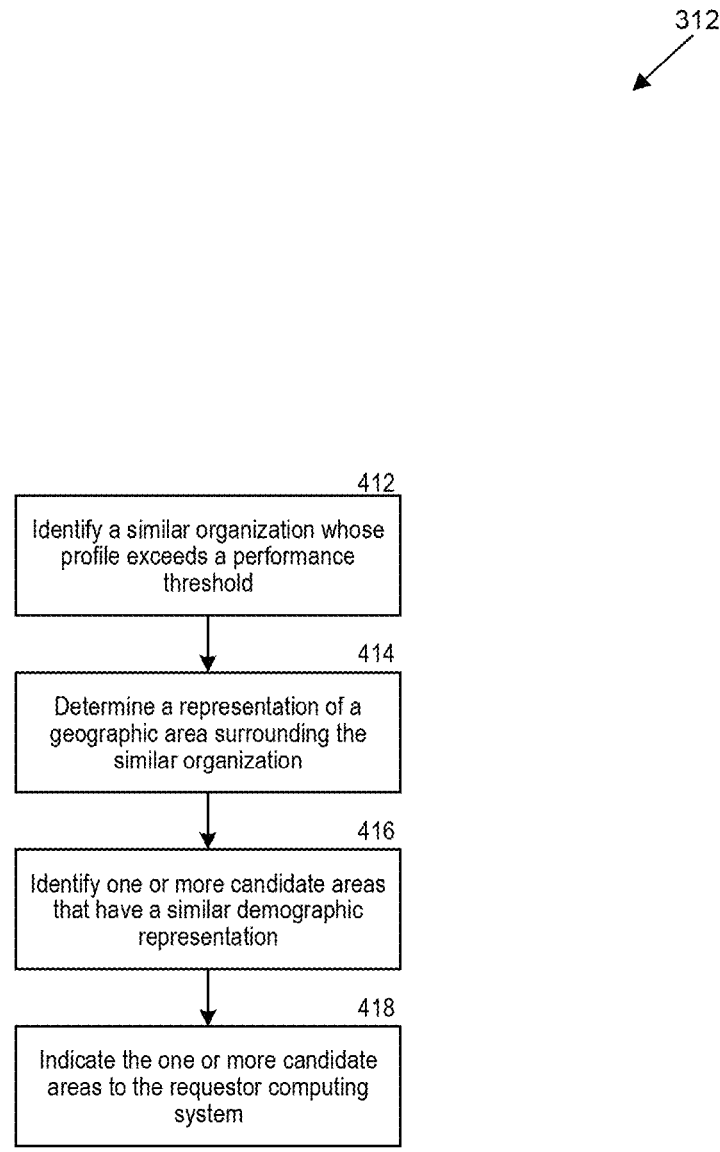

FIG. 4B illustrates a flowchart of example operations related to expansion location identification. In some embodiments, at least the function-execution module 212 of the platform 102 performs the example operations. At 412, the platform 102 identifies a similar organization to the requesting organization associated with the requestor computing system 106. In particular, the platform 102 identifies a similar organization whose profile exceeds a performance threshold. At 414, the platform 102 determines a representation of a geographic area surrounding the similar organization. At 416, the platform 102 identifies one or more candidate areas having similar representations. At 418, the platform 102 indicates the one or more candidate areas to the requestor computing system 106 (e.g., via the first coordinated display interface).

In an illustrative example, the platform 102 identifies a well-performing dry cleaning business, and the business is located near an office building, a day care, and a transit stop nearby. In some embodiments, the location of the business is represented by relative distances to each of such landmarks. The platform 102 can then identify other similar locations as candidates for another dry cleaning business. Thus, in some embodiments, the platform 102 is configured to identify location clusters defined by business types and amenities and to use the location clusters to support requesting organizations.

User Function 3: Identify Better Partners

An example user function notifies users of a requestor computing system 106 (e.g., a business owner) that the users can improve performance (e.g., save money, improve turn-around/delivery time) by switching to a new supplier for a particular type of product, service, or utility that the users routinely purchase.

In some embodiments, the example user function parses transaction data (e.g., memos in transactions) to determine types of goods and service purchased by the users, amount spent, and suppliers or sources. A cost basis is determined and compared anonymously with respective cost bases of other users and organizations in the area and industry. Alternative suppliers or sources with which an improved cost basis can be reached are then identified and indicated to the users of the requestor computing system 106 (e.g., via a first coordinated display interface).

User Function 4: Attractive Capital

An example user function precludes a need for users of a requestor computing system 106 to continuously provide data to a support organization computing system 104 and wait extended periods of time for responses. In particular, the example user function enables users at the support organization computing system 104 to transmit an offer of term loans or line of credit offers to the requestor computing system 106 that can be immediately accepted in one-click at the requestor computing system 106. The transmitted offers are based on up-to-date dynamically updated data and profiles related to the requestor computing system 106. Thus, users of a requestor computing system 106 do not need to wait weeks to receive a small term loan or line of credit.

In some embodiments, the user function obtains credentialed access to bank account, accounting system, and point-of-sale platform of a requestor computing system 106. With this access, transaction data is made visible (e.g., via the second coordinated display interface) to users of the support organization computing system 104 (e.g., lenders) for continuous and real-time evaluations. In some embodiments, the user function detects signals or trends in the transaction data that indicate an arising or upcoming need for capital, and the users of the support organization computing system 104 can readily address such need with little-to-no dependency on the users of the requestor computing system 106.

With improvement to the level of ease, a volume of loans, offers, and borrowers increases. Ultimately, this may result in a higher tolerance for default, and users of the support organization computing system 104 can say "we can now tolerate an additional X % of defaults because we now make more loans to more borrowers." As a result, a community has improved access to capital and resources. In some embodiments, the platform 102 determines the additional percentage of tolerated defaults automatically for a given support organization computing system 104.

User Function 5: Peer Connections

An example user function improves an ability of users at the requestor computing system 106 (e.g., business owners) to identify opportunities to collaborate with other users. In particular, the example user function enables a given user (or group/organization/entity thereof) to look for other businesses serving similar customers in similar areas. For example, a lawn care company and gutter cleaning company serve similar customers in similar regions and may want to consider co-marketing, or three pizza places nearby all buy flour every month and may save money by pooling their purchases together.

In some embodiments, organizations can create local pods where similar organizations cooperate and band together to create an improved understanding of local dynamics, challenges, and opportunities. Each requestor computing system 106 in a pod of organizations can contribute information on fixed costs (e.g., utilities, rent, transportation) for the respective organization, allowing the respective organizations to benchmark themselves against others. As more businesses are invited, the level of understanding improves.

Figure 4C:
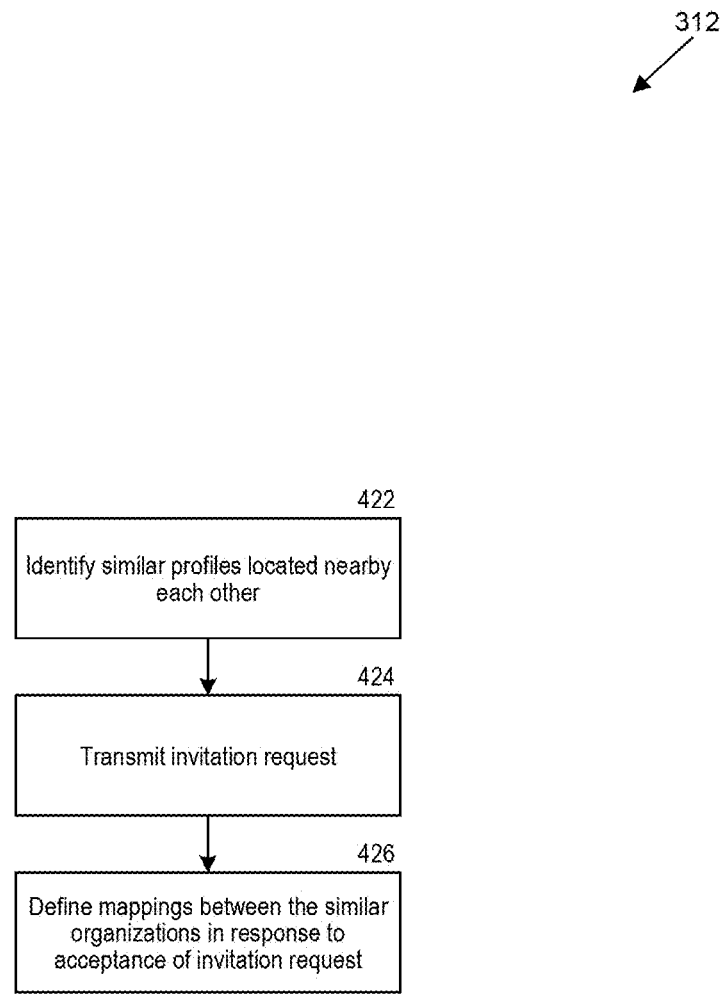

FIG. 4C illustrates a flowchart of example operations related to mappings between multiple requestor computing systems 106. In some embodiments, at least the function-execution module 212 of the platform 102 performs the example operations. At 422, the platform 102 identifies similar multi-dimensional profiles located nearby each other. For example, the platform 102 identifies profiles that indicate a same business type (e.g., all pizza places, all dry cleaner businesses). As another example, the platform 102 identifies profiles that indicate a same customer type or a same product or service. At 424, the platform 102 transmits invitation requests to or among the requestor computing systems 106 associated with the profiles. In doing so, the users and organizations having similar profiles are invited to join together in a pod, a social group, a data sharing arrangement, a business collaboration, and/or the like. At 426, the platform 102 defines mappings between the requestor computing systems 106 based on detecting acceptances to the invitation requests. For example, the mappings indicate that the relationship between the users and organizations who join together in response to the invitation request transmitted to or among the requestor computing systems 106.

User Function 6: Industry Trends

Localized industry sales benchmarks and forecasts may be based on highly granular, frequent data provides additional context and situational awareness to users of requestor computing systems 106 (e.g., business owners).

User Function 7: Performance Benchmarking

An example user function contextualizes time-wise performance and information in a multi-dimensional profile for a requestor computing system 106 based on organization type (e.g., industry, business type) and location. Users of a requestor computing system 106 can answer questions like "Last month I saw a drop in sales, did it happen to everyone nearby or just to me?" to inform downstream operations and decisions, including marketing, promotions, and inventory planning.

Figure 4D:
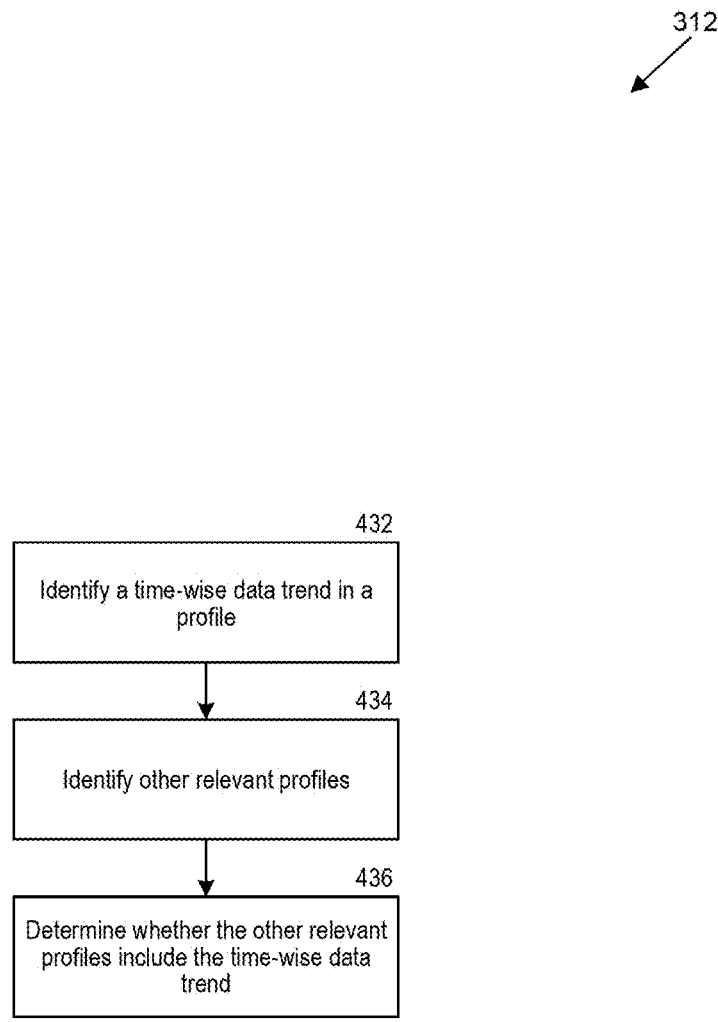

FIG. 4D illustrates a flowchart of example operations related to benchmarking and contextualizing time-wise performance. In some embodiments, at least the function-execution module 212 of the platform 102 performs the example operations. At 432, the platform 102 identifies a time-wise data trend in a given profile. For example, a user at a requestor computing system 106 highlights a portion of a graph of sales volume over time. As another example, the time-wise data trend is a number of credit card transactions over a period of time. At 434, the platform 102 identifies other relevant profiles, for example, profiles with a similar organization type and/or profiles located within a pre-determined radius of the given profile. At 436, the platform 102 determines and indicates whether the other relevant profiles include the time-wise data trend to the requestor computing system 106 of the given profile.

User Function 8: Identify Neighborhood Gaps

An example user function identifies geographical areas underserved by providers of basic needs like healthy foods, daycares, and pharmacies. In some embodiments, the example user function is available for users of a requestor computing system 106 (e.g., small business owners) and for users of a support organization computing system 104 (e.g., CDFI users, lenders).

Figure 4E:
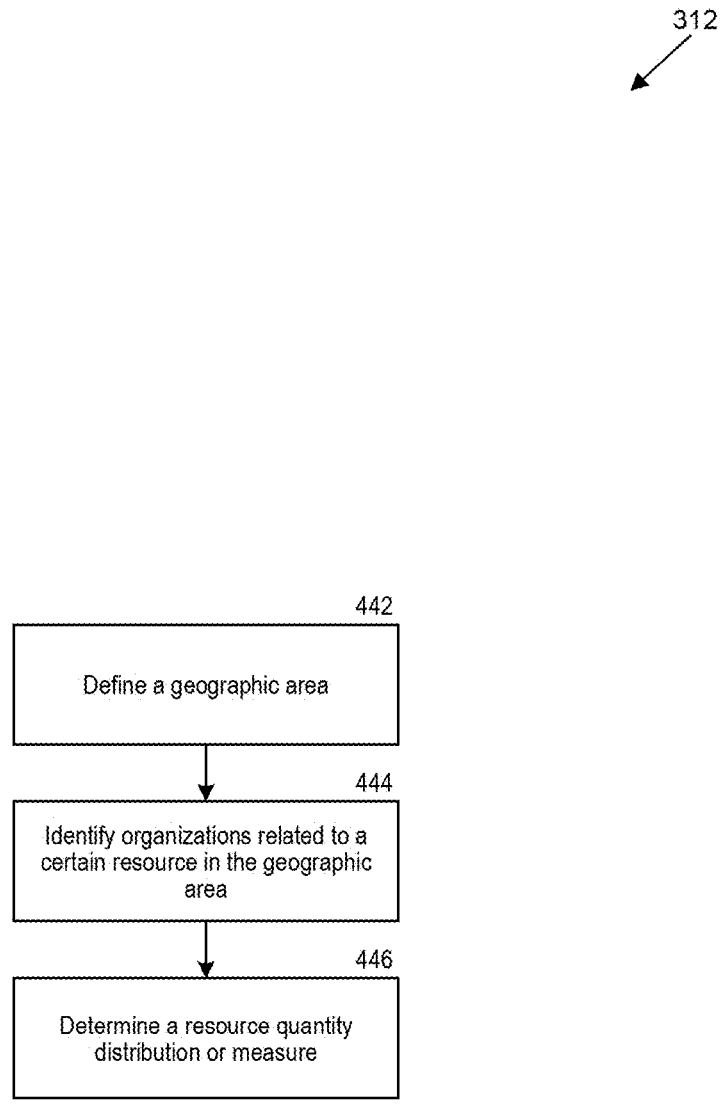

FIG. 4E illustrates a flowchart of example operations related to identifying area gaps. In some embodiments, at least the function-execution module 212 of the platform 102 performs the example operations. At 442, the platform 102 defines a geographic area. For example, the geographic area is granular, such as a two-block radius, or a defined zip code, neighborhood, and/or the like. At 444, the platform 102 identifies profiles of organizations that are located within the defined geographic area. In particular, the platform 102 identifies profiles related to a certain resource or basic need, such as healthy food, daycare, and pharmacies. At 446, the platform 102 determines a resource density measure or distribution for the geographic area based on relative locations of the profiles within the geographic area. By doing so, the platform 102 can determine whether any gaps for a certain resource exist in the geographic area and/or whether the geographic area itself can be classified as a resource gap. In some embodiments, the resource density measure or distribution is determined further based on a number of and characteristics of residents that live in the geographic area.

User Function 9: Nudge Vulnerable Businesses

An example user function is configured to proactively measure, monitor and manage a financial health dimension of a given multi-dimensional profile. Predictive indicators can signal risk of deteriorating financial health for a business which improves an ability of users at a support organization computing system 104 to intervene earlier with support and advice and loan or line of credit offers to the users of a requestor computing system 106 if applicable. In some embodiments, the predictions made by the platform 102 (e.g., by the prediction module 208) include financial health metrics or values. As discussed, the predictions are made based on data and metrics in multi-dimensional profile that are made available by the users of the requestor computing system 106. Financial health indicators can be automatically calculated based on the profile data and based on information retrieved from an external data system 108, such as bank account information. In some embodiments, financial health indicators are further calculated and predicted using other information that can be gathered through direct surveying and questioning to the users of the requestor computing system 106. Such information includes financial obligations, cash reserves, financial management system, risk planning, cash flow variability planning, insurance, access to credit, sustainable debt load, access to investment capital, and/or the like.

User Function 10: Serve More Entrepreneurs

An example user function assists and supports users of a support organization computing system 104 (e.g., a business advisor) in filtering through noise in order to prioritize distribution and allocation of time and resources. This increases both efficiency and effectiveness, meaning support organization users can serve more business and create greater impact.

Figure 4F:
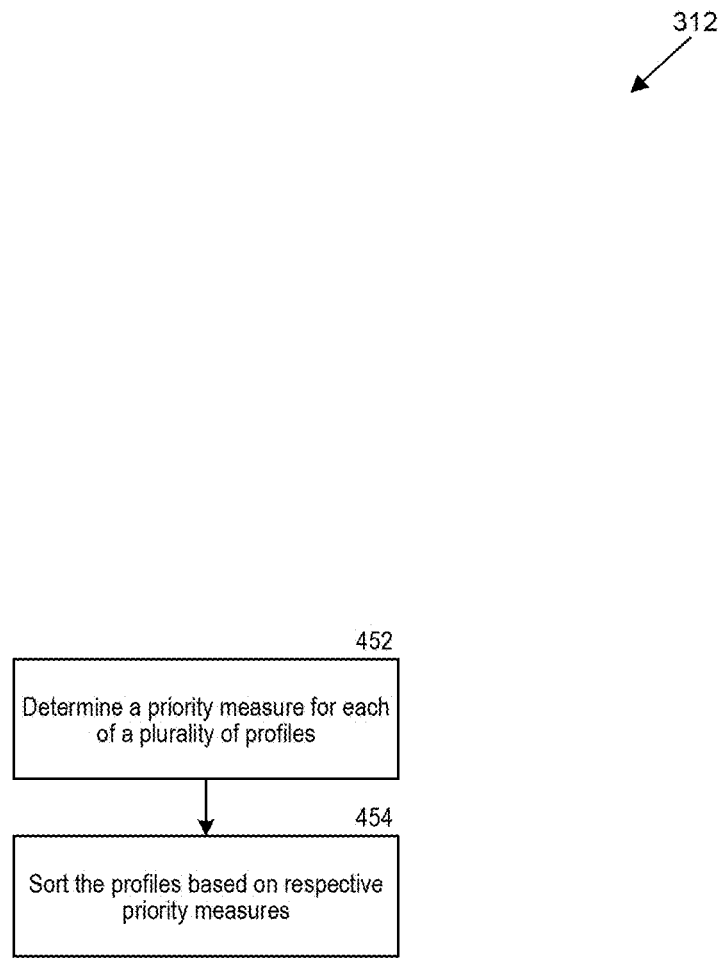

FIG. 4F illustrates a flowchart of example operations related to prioritization of time/resource allocation. In some embodiments, at least the function-execution module 212 of the platform 102 performs the example operations. At 452, the platform determines and associates a priority measure for each of a plurality of requestor computing systems 106 mapped to a given support organization computing system 104. The priority measure is determined based on a respective multi-dimensional profile. At 454, the plurality of requestor computing systems 106 are sorted based on respective priority measures. In some embodiments, the priority measures are specific to a certain resource, such that a support organization user can sort the plurality of requestor computing systems 106 with respect to a priority or need for the certain resource.

User Function 11: Measure True Impact

An example user function provides three-dimensional impact reporting. In particular, the example user function determines an impact that is realized over time, the quality of the impact, and the context within which the impact was created. For instance, users of a support organization computing system 104 can verify that a requesting organization actually hired an individual, for what role, and with what compensation and benefits which can be used to determine whether it is a living wage.

With this information, these community organizations can improve their services and raise further support from outcome-focused investors.

To do so, the example user function validates and adds context for outcomes that create jobs and wealth in local communities. Hires, living wages, benefits offered, and improved profits can be verified through a combination of financial data gathered via retrieved contextual data and qualitative data gathered via surveys sent to the users at requestor computing systems 106. This information is mapped against other layers of community and location-based data to add context to the impact. Thus, the example user function answers questions including "what are the demographics in the neighborhood where the job was created," "is this a high paying job in the area," "what are the fixed costs of living in that area," and "where is the disposable income likely to be spent?"

IV. Example User Interfaces

As discussed above, embodiments disclosed herein provide shared visibility of profile data and prediction data between computing systems mapped together based on relationships between respective users. In particular, according to example embodiments, a first coordinated display interface is displayed at a requestor computing system 106, and a second coordinated display interface is displayed at a support organization computing system 104 mapped with the requestor computing system 106. The first coordinated display interface and the second coordinated display interface each include profile data and prediction data for the requestor computing system 106. Each coordinated display interface locally enables relevant user functions for respective users at each of the requestor computing system 106 and the support organization computing system 104.

Figure 5A:
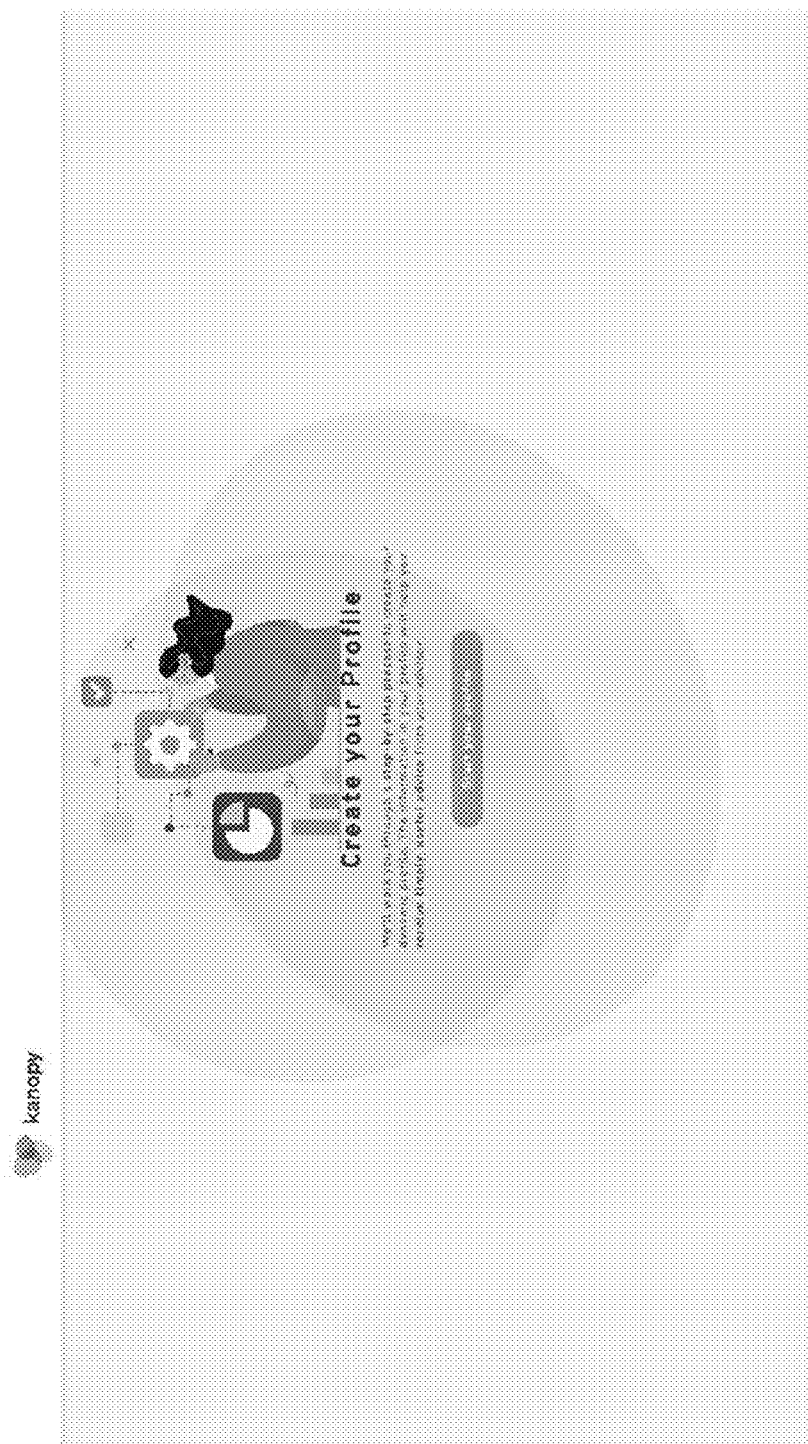
FIGS. 5A-5Q illustrate example user interfaces displayed by a predictive profiling platform to a first type of system.
Figure 5B:
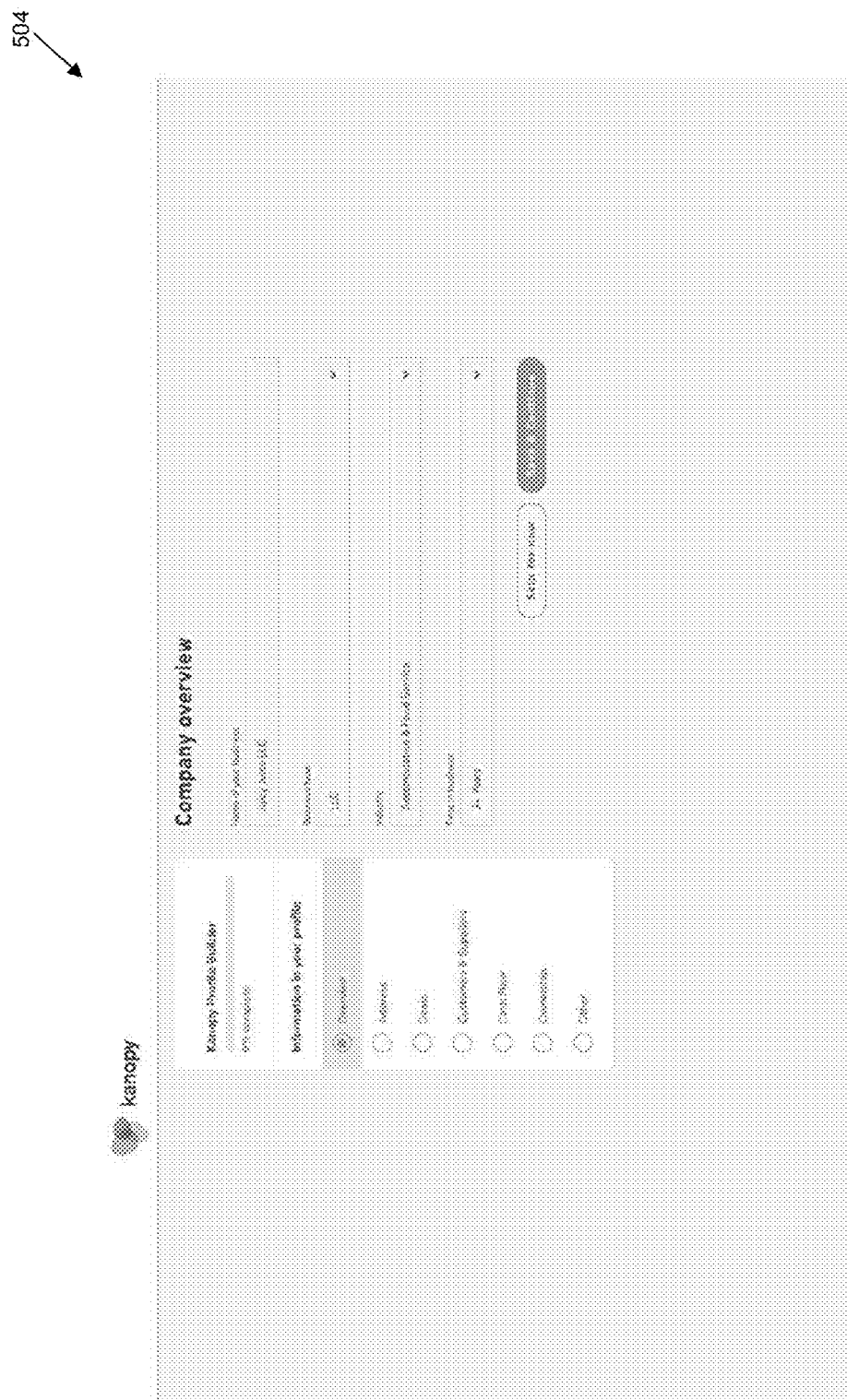
Figure 5C:
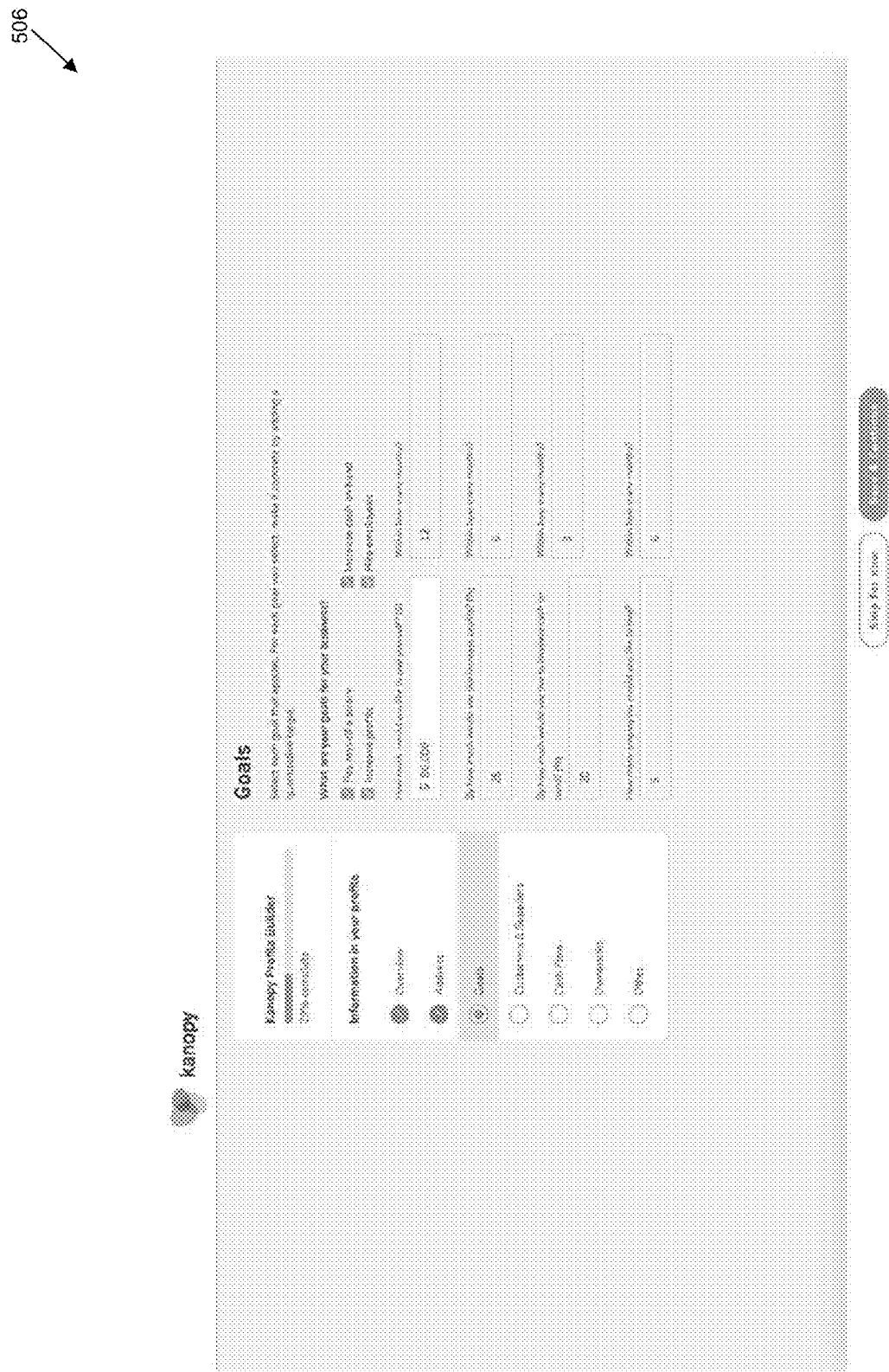
Figure 5D:
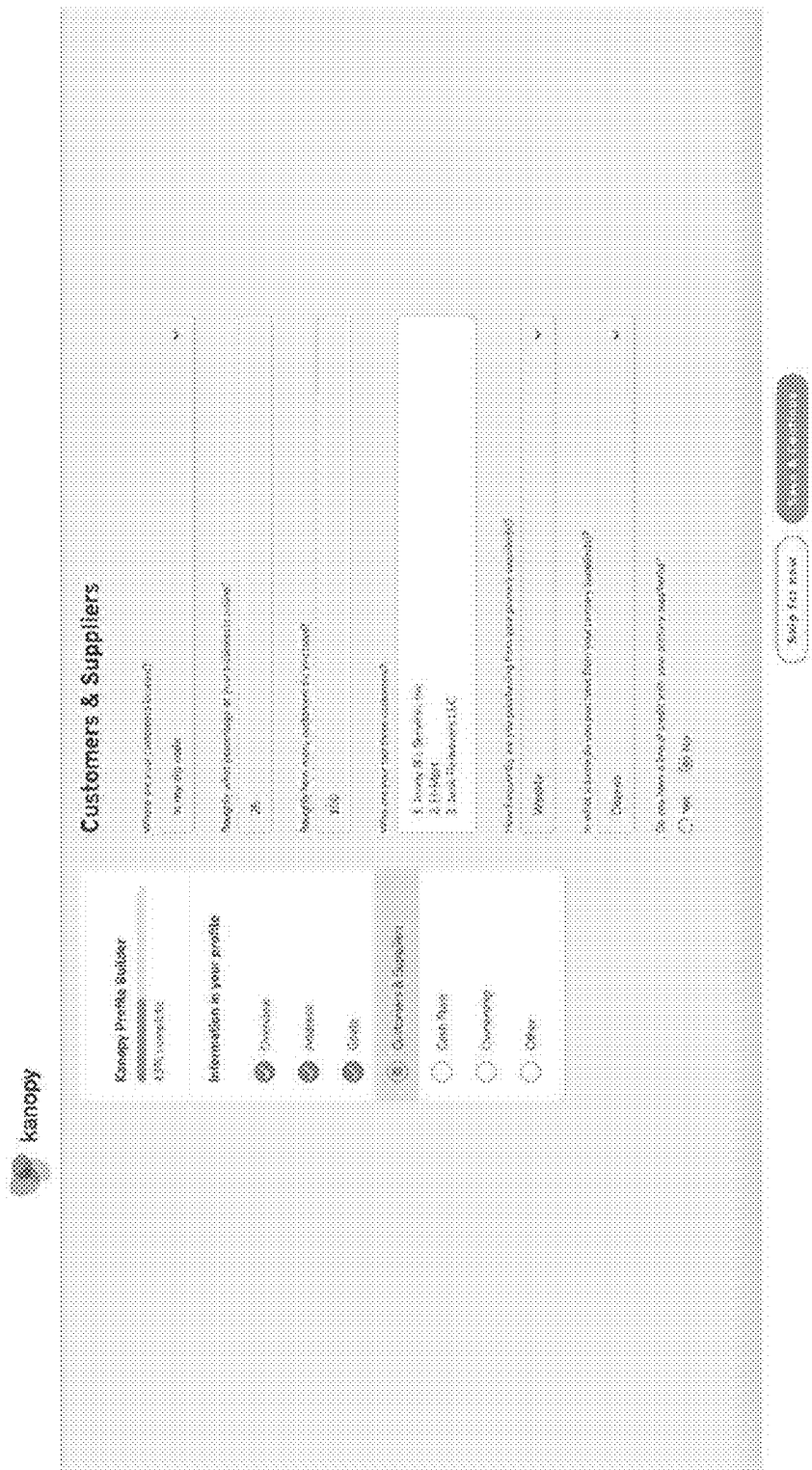
Figure 5E:
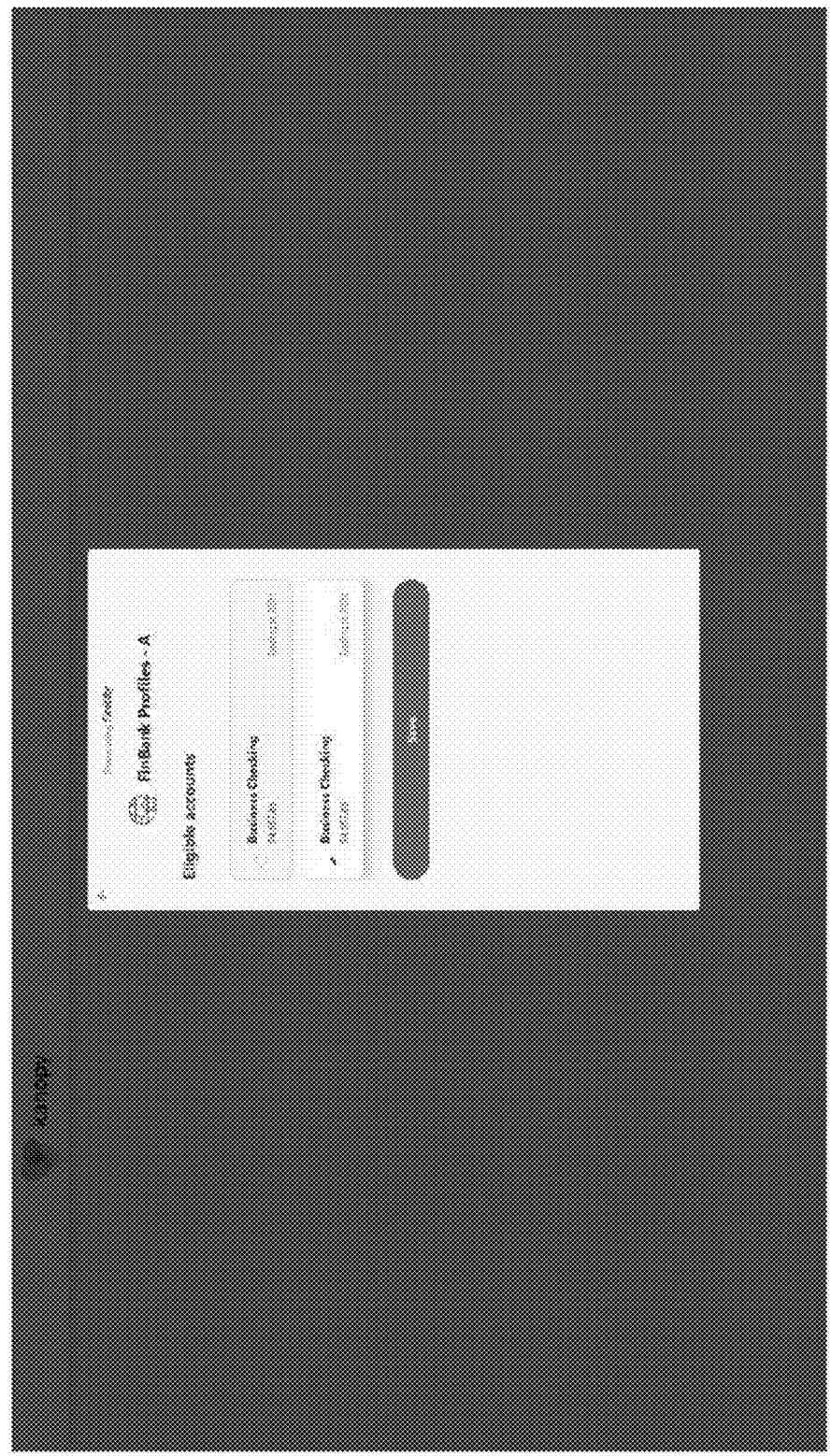
Figure 5F:
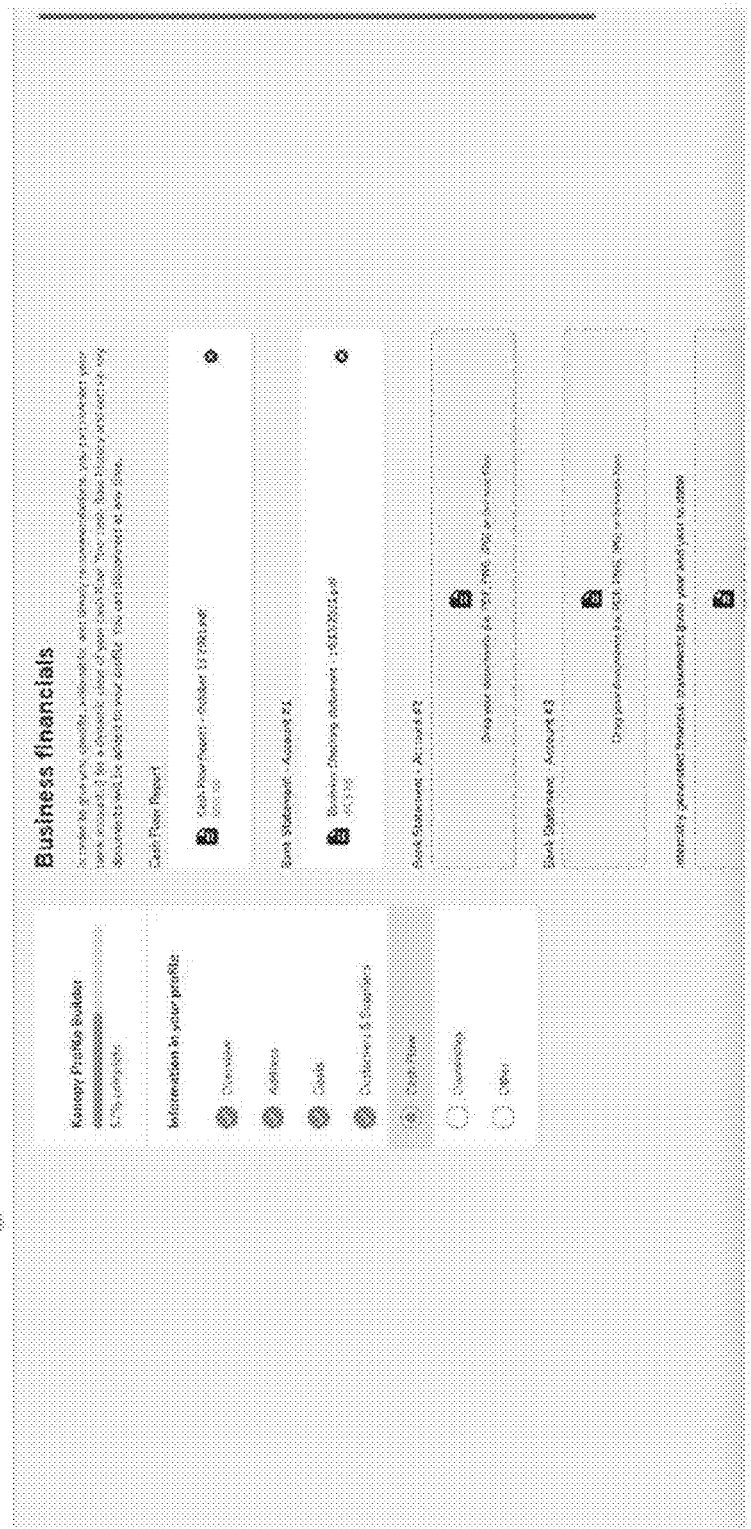
Figure 5G:
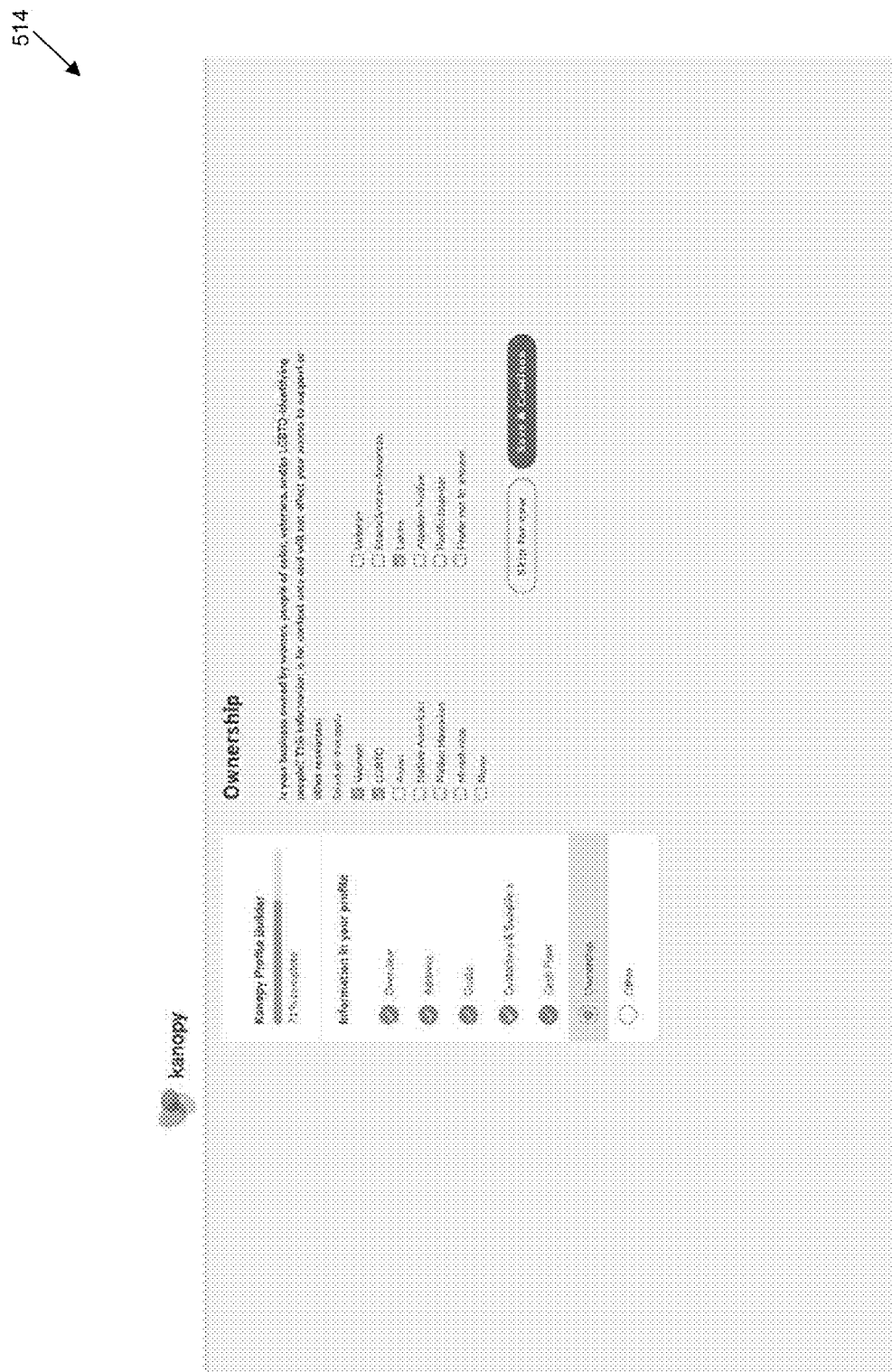
Figure 5H:
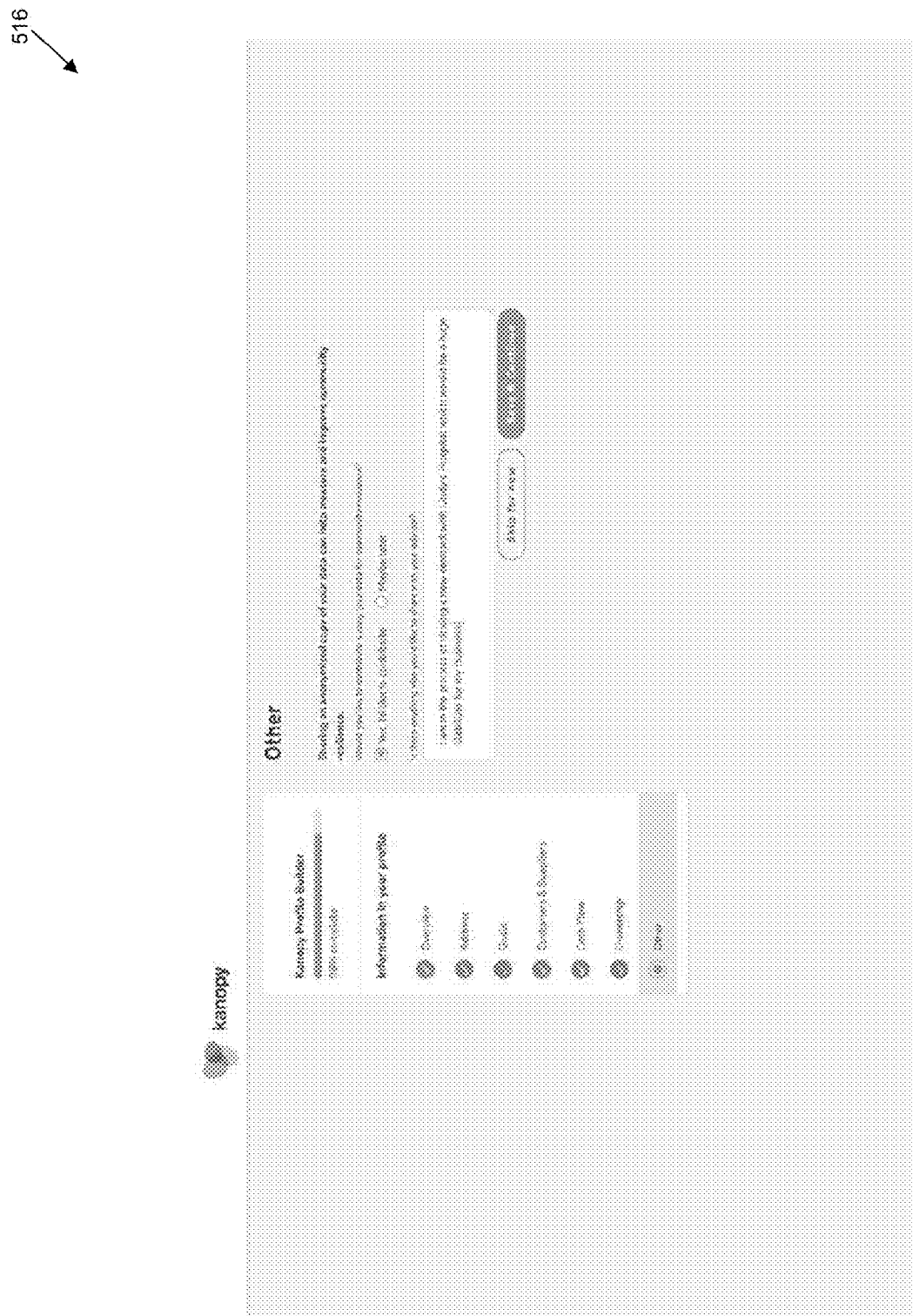
Figure 5I:
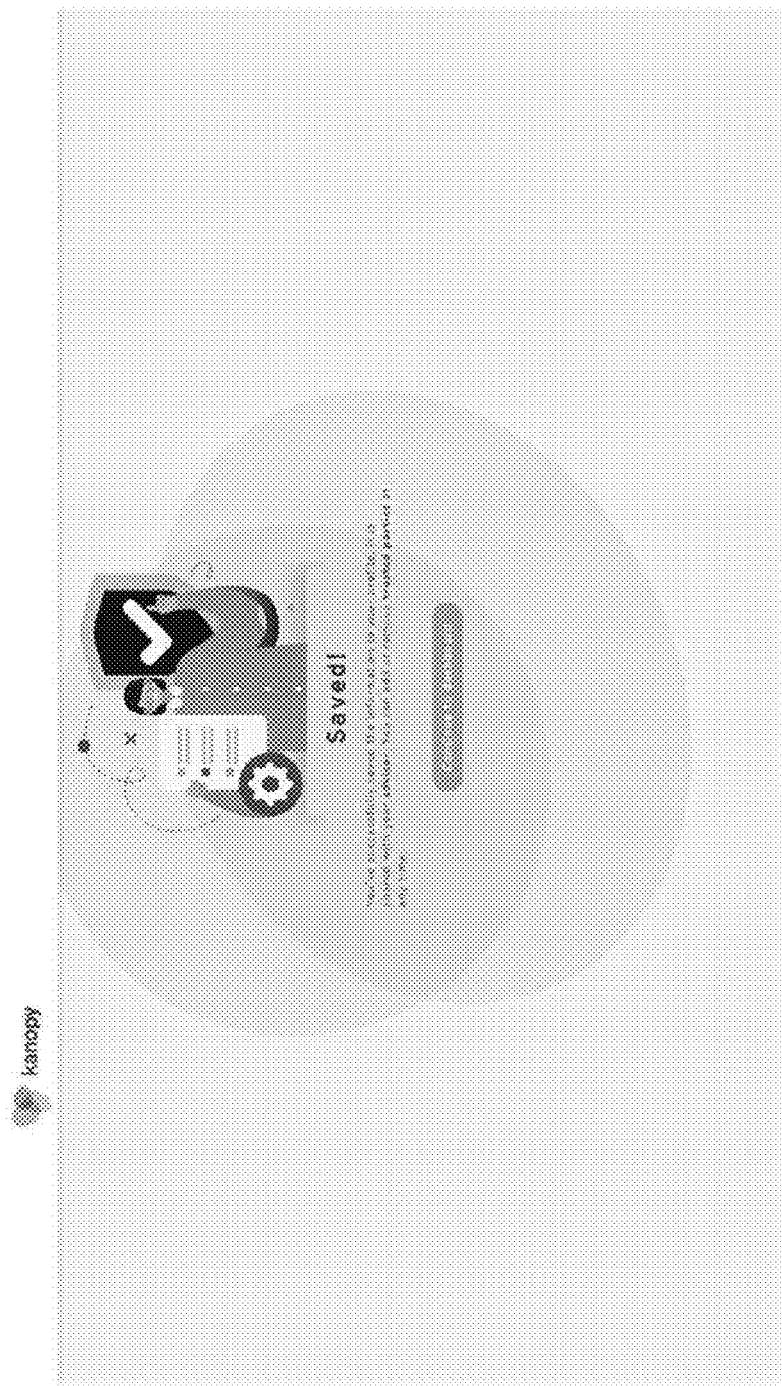
Figure 5J:
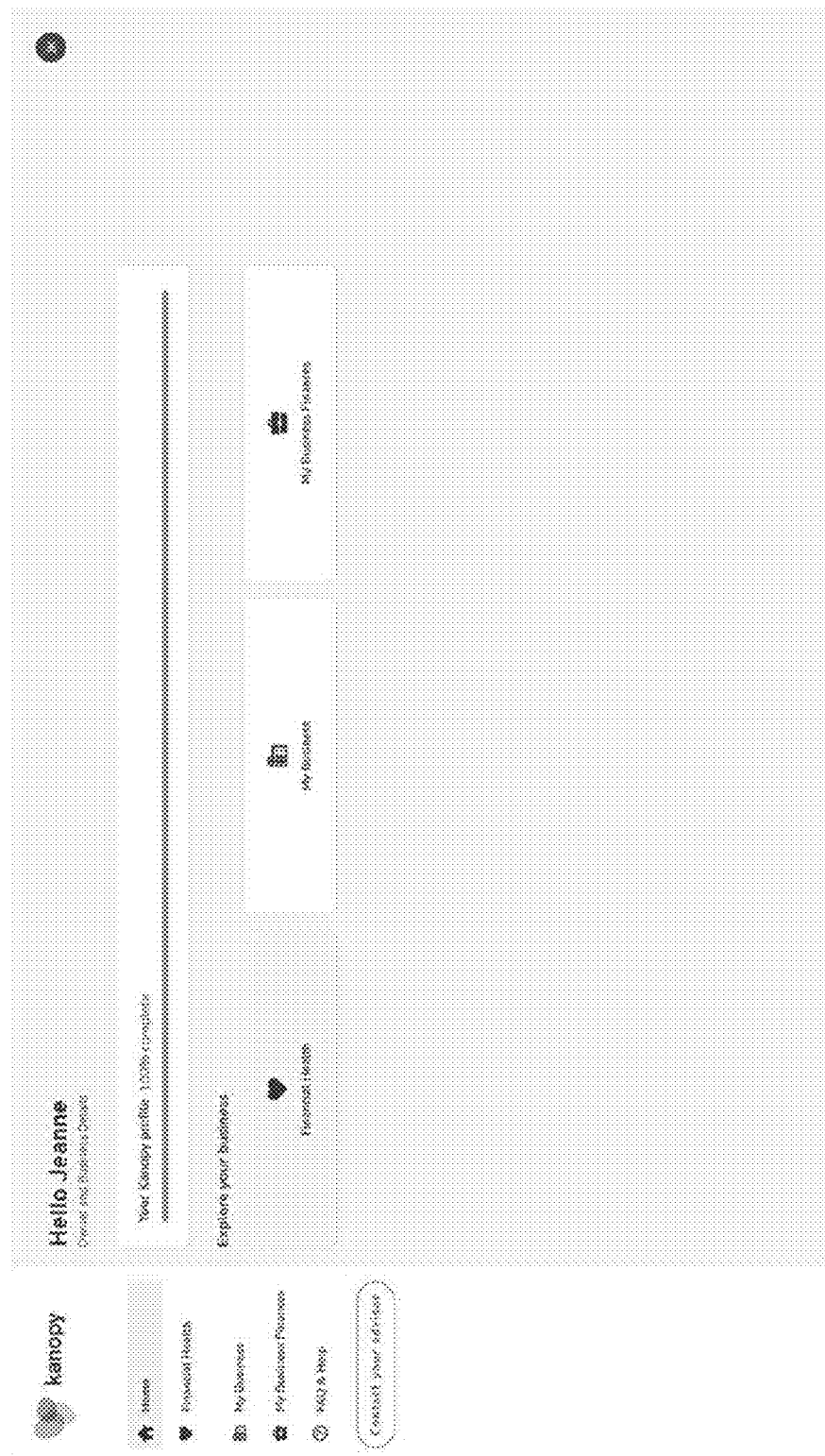
Figure 5K:
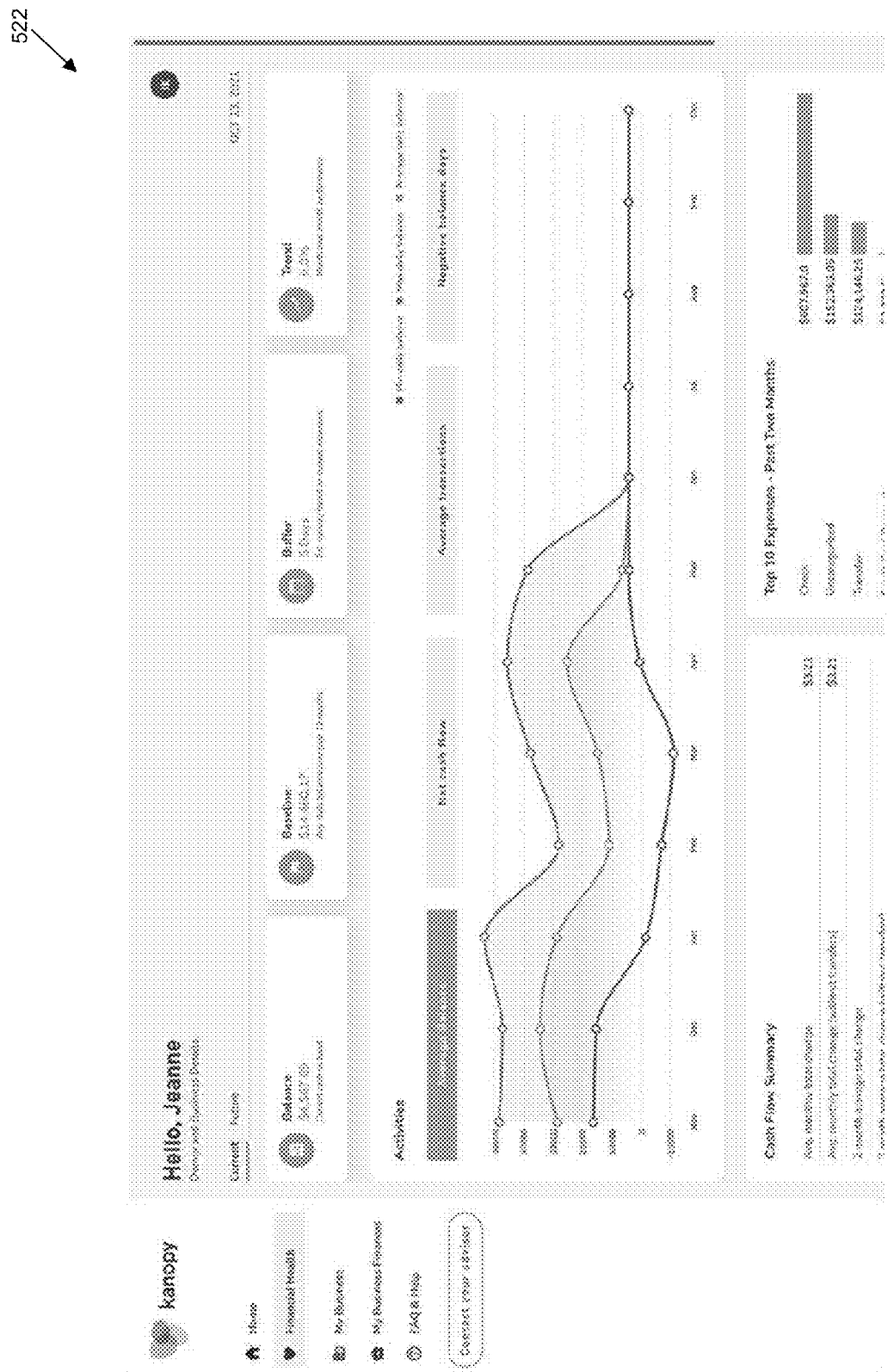
Figure 5L:
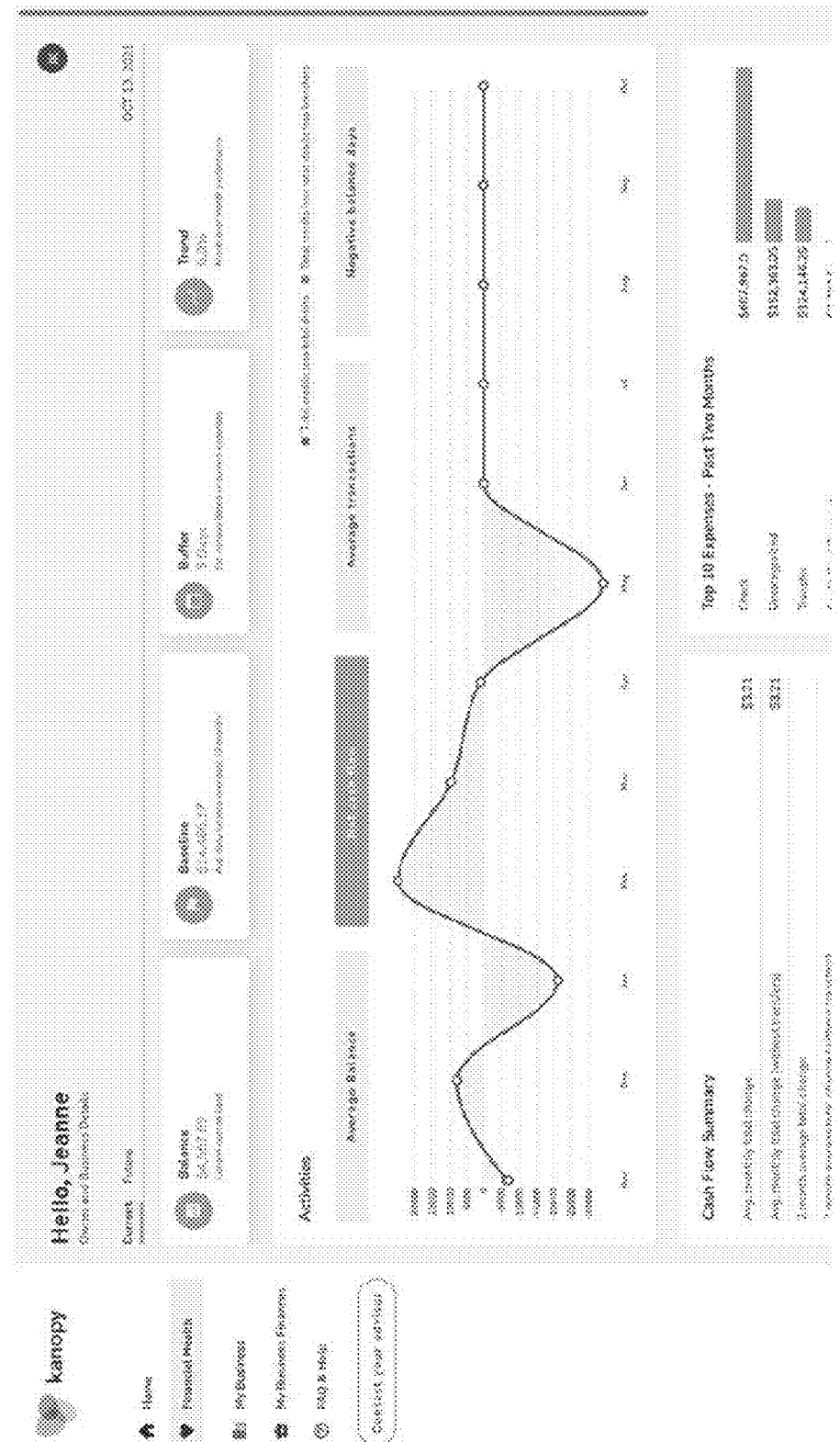
Figure 5M:
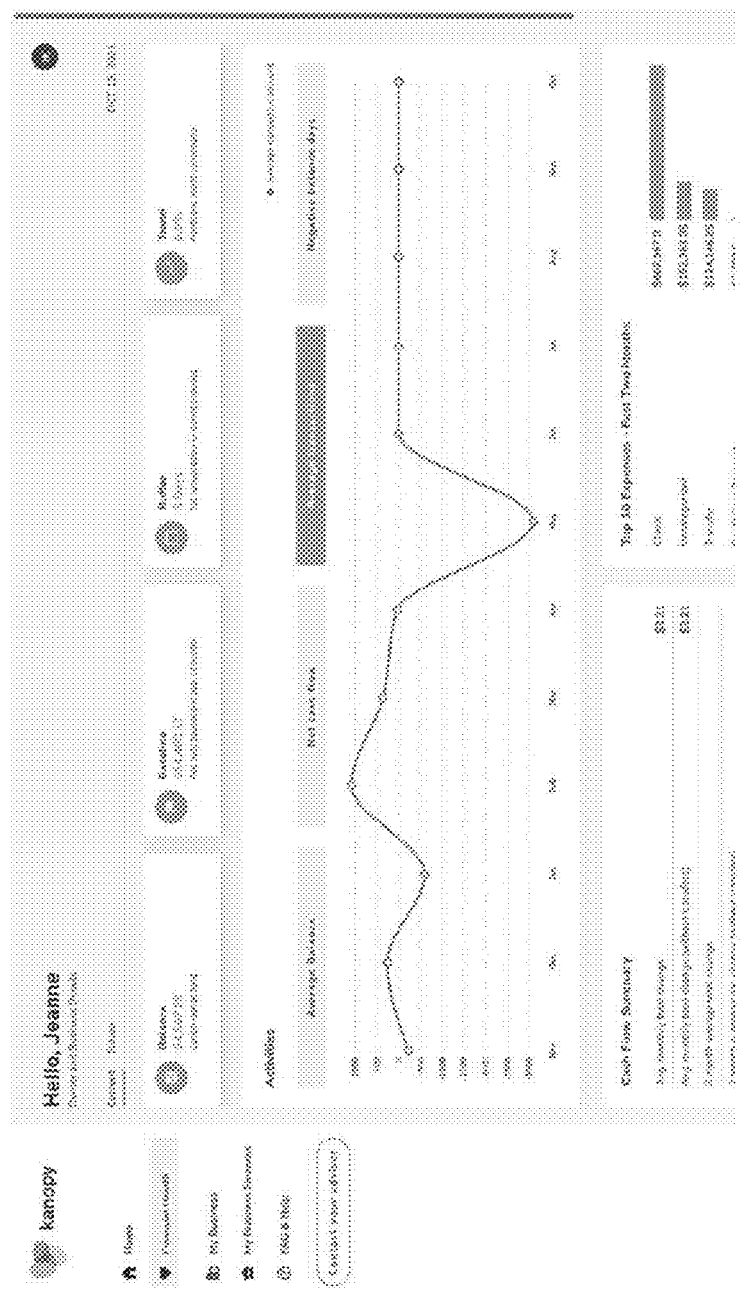
Figure 5N:
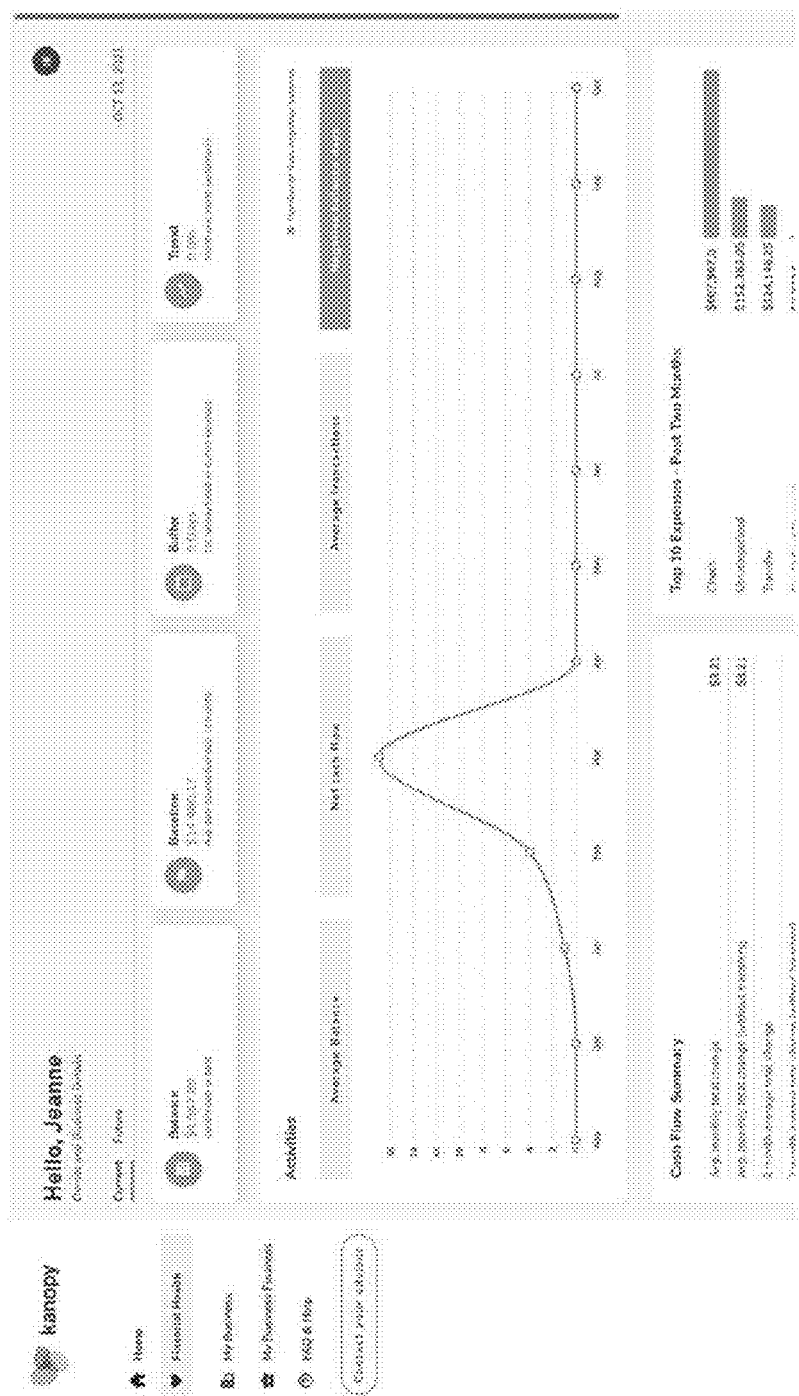
Figure 50:
Figure 5P:
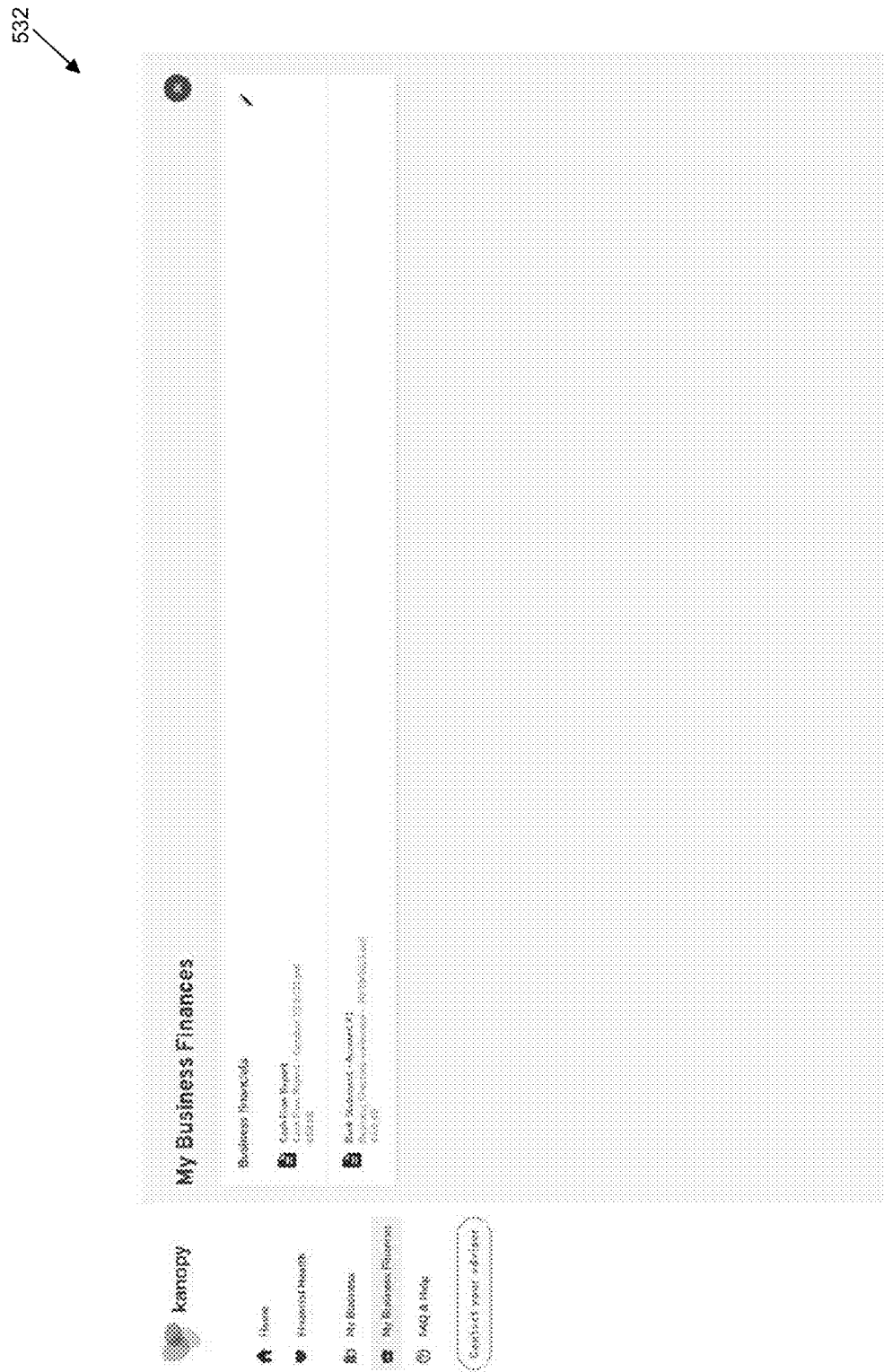
Figure 5Q:
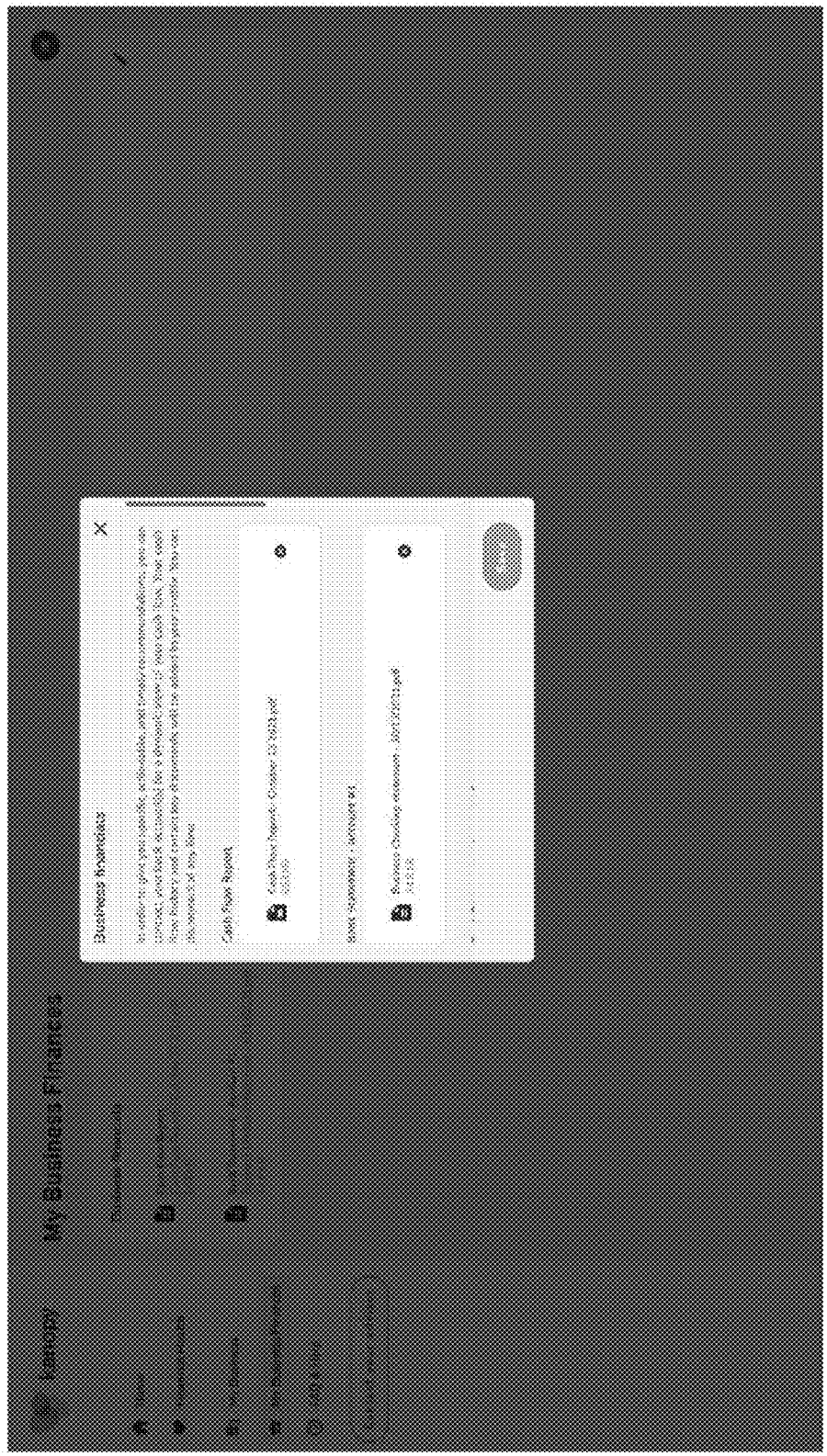

FIGS. 5A-5Q illustrate example coordinated display interfaces provided at a requestor computing system 106. In an example embodiment, the coordinated display interfaces shown in FIGS. 5A-5Q are examples of first coordinated display interfaces displayed at the requestor computing system 106.

FIG. 5A illustrates an interface 502 at which users of a requestor computing system 106 can begin a process of generating a multi-dimensional profile for the requestor computing system 106. In response to user selection of an interactable feature in interface 502, the user is prompted to input information for specific dimensions for a multi-dimensional profile.

FIG. 5B illustrates an interface 504 at which certain dimensions of the multi-dimensional profile are indicated to the user and made available for input. In particular, the interface 504 indicates a name dimension, a business type dimension, an industry type/category dimension, and a time-in-business dimension. The user, via the interface 504, can input data for each of the indicated dimensions.

FIG. 5C illustrates an interface 506 that indicates additional dimensions of a multi-dimensional profile and enables a user to input data specific to each of the additional dimensions. In the illustrated embodiment, the dimensions indicated in interface 506 relate to future goals of the user and the requesting organization.

FIG. 5D illustrates an interface 508 that indicates additional dimensions of a multi-dimensional profile and enables a user to input data specific to each of the additional dimensions. In the illustrated embodiment, the dimensions indicated in interface 506 relate to customers and suppliers related to the user and the requesting organization. In some embodiments, data provided for these dimensions are used to identify other organizations that are related to the requesting organization. Thus, in some embodiments, identification of other organizations in the interface 508 enables additional mappings between the requestor computing system 106 and other systems to be defined.

FIG. 5E illustrates an interface 510 that indicates additional dimensions of a multi-dimensional profile and enables a user to input data specific to each of the additional dimensions. In particular, the interface 510 enables a user to specify certain contextual data to be included with or used with the multi-dimensional profile. In the illustrated embodiment, the interface 510 enables a user to specify one or more financial accounts or bank accounts that are used or owned by the requesting organization. In some embodiments, a user further provide credentials or otherwise enables the platform 102 to have credentialed access to the specified financial accounts or bank accounts. In doing so, effort and resources on the end of the requestor computing system 106 is conserved, as the users thereof do not need to retrieve account data from the accounts themselves.

In particular, as seen in FIG. 5F, the platform 102 is configured to automatically retrieve data from the accounts specified by the user via the interface 510. FIG. 5F illustrates an interface 512 that indicates data automatically retrieved from the accounts specified by the user. In the illustrated example, the automatically retrieved data includes reports, statements, and documents associated with the specified accounts. As discussed herein, the platform 102 automatically retrieves data via APIs of external data systems 108, such as financial computing systems at which the specified accounts are managed, for example. For example, the platform 102 retrieves at least the data indicated in interface 510 via an API such as Finicity, Plaid, and/or the like.

FIG. 5G illustrates an interface 514 that indicates additional dimensions of a multi-dimensional profile and enables a user to input data specific to each of the additional dimensions. In the illustrated example, the additional dimensions relate to demographics associated with the user and the requesting organization associated with the requestor computing system 106.

FIG. 5H illustrates an interface 516 that enables a communication between the user at the requestor computing system 106 and users at the support organization computing system 104. As illustrated, the user can include additional information or a message while providing profile data, and the additional information or message can be used by the platform 102 and/or support organization users as part of the profile data.

Each of the example interfaces 504-516 represent requests for profile data to the user. In some examples, the user only provides data for a subset of the indicated dimensions, and in some embodiments, location-based contextual data, extrapolated data, interpolated data, prediction data, and/or the like are used to supplement the user-provided data.

FIG. 5I illustrates an interface 518 at which the user concludes providing profile data to the platform 102. Via the interface 518, the user can save the profile data, can cause the multi-dimensional profile to be automatically sent to a support organization computing system 104, and/or the like.

FIG. 5J illustrates an interface 520 that is displayed subsequent to the user providing profile data. In the illustrated example, the interface 520 can indicate a percentage or a quantity of profile data provided by the user, such as with respect to a number of dimensions. In the illustrated example, the interface 520 includes a feature that enables the user to initiate a communication session with users at a support organization computing system 104. For example, the platform 102 detects user interaction with said feature (e.g., a button labelled "Contact your advisor") and initiates a telephone call, a video conferencing meeting, an instant messaging session and/or the like. As another example, the platform 102 transmits a meeting invitation message, a call request message, an automated e-mail message, and/or the like to the support organization computing system 104. As yet another example, the platform 102 provides a message template at the requestor computing system 106 for the user to prepare a message to send to the support organization computing system 104.

FIG. 5K illustrates an interface 522 that displays at least one time-wise dimension of a multi-dimensional profile. In the illustrated example, the interface 522 displays a time-wise graph of average balance data included in the multi-dimensional profile. In some embodiments, the time-wise dimension of the multi-dimensional profile (e.g., the displayed graph) is generated by the platform 102 based on discrete time points provided by the user or automatically retrieved by the platform 102.

FIG. 5L illustrates an interface 524 that displays another example time-wise dimension of a multi-dimensional profile. In the illustrated example, the interface 524 displays a time-wise graph of net cash flow data included in the multi-dimensional profile. In some embodiments, the time-wise graph is generated by the platform 102 based on discrete time points provided by the user or automatically retrieved by the platform 102.

FIG. 5M illustrates an interface 526 that displays another example time-wise dimension of a multi-dimensional profile. In the illustrated example, the interface 526 displays a time-wise graph of average number of transactions, with individual number of transactions at certain timepoint being indicated in the multi-dimensional profile. In some embodiments, the time-wise information displayed in the interface 526 is generated by the platform 102 from data provided by the user or automatically retrieved from external data sources.

FIG. 5N illustrates an interface 528 that displays another example time-wise dimension of a multi-dimensional profile. In the illustrated example, the interface 528 displays a time-wise graph of negative balance days. In some embodiments, the platform 102 determines the number of negative balance days in each of a plurality of pre-defined time periods (e.g., monthly, bimonthly, quarterly, annually). In some embodiments, the platform 102 determines the number of negative balance days using data provided by the user or automatically retrieved from external data sources.

In each of the interfaces 522-528, a buffer metric is indicated. The buffer metric is an example of a financial health metric that predicts a future event based on current trends. Thus, for example, example interfaces display prediction data.

FIG. 5O illustrates an interface 530 that displays other examples of prediction data. In the illustrated example, the interface 530 displays a forecasted or predicted amount of cash at certain future timepoints. In some embodiments, the predictions are made by the platform 102 using various prediction models, including extrapolation models, regression models, machine learning models, and/or the like. As further shown in the illustrated example, the interface 530 enables a user to set future goals and targets, and in some embodiments, the user is reminded of the future goals and targets based on alerts provided at the requestor computing system 106.

FIGS. 5P and 5Q illustrate an interface 532 and an interface 534, respectively, that enable a user to edit and restrict contextual data retrieved and used by the platform 102. In the illustrated example, a report and a statement are retrieved by the platform 102 from a financial account system, and the report and the statement are indicated to the user in interface 532. Via interface 534, the user is able to remove any one or more of the report and the statement. As such, the user is able to modify data used for predictions and restrict information from being shared with users of a support organization computing system 104 mapped to the requestor computing system 106.

FIG. 6A-6E illustrate example coordinated display interfaces provided at a support organization computing system 104. In an example embodiment, the coordinated display interfaces shown in FIGS. 6A-6E are examples of second coordinated display interfaces displayed at the support organization computing system 104.

Figure 6A:
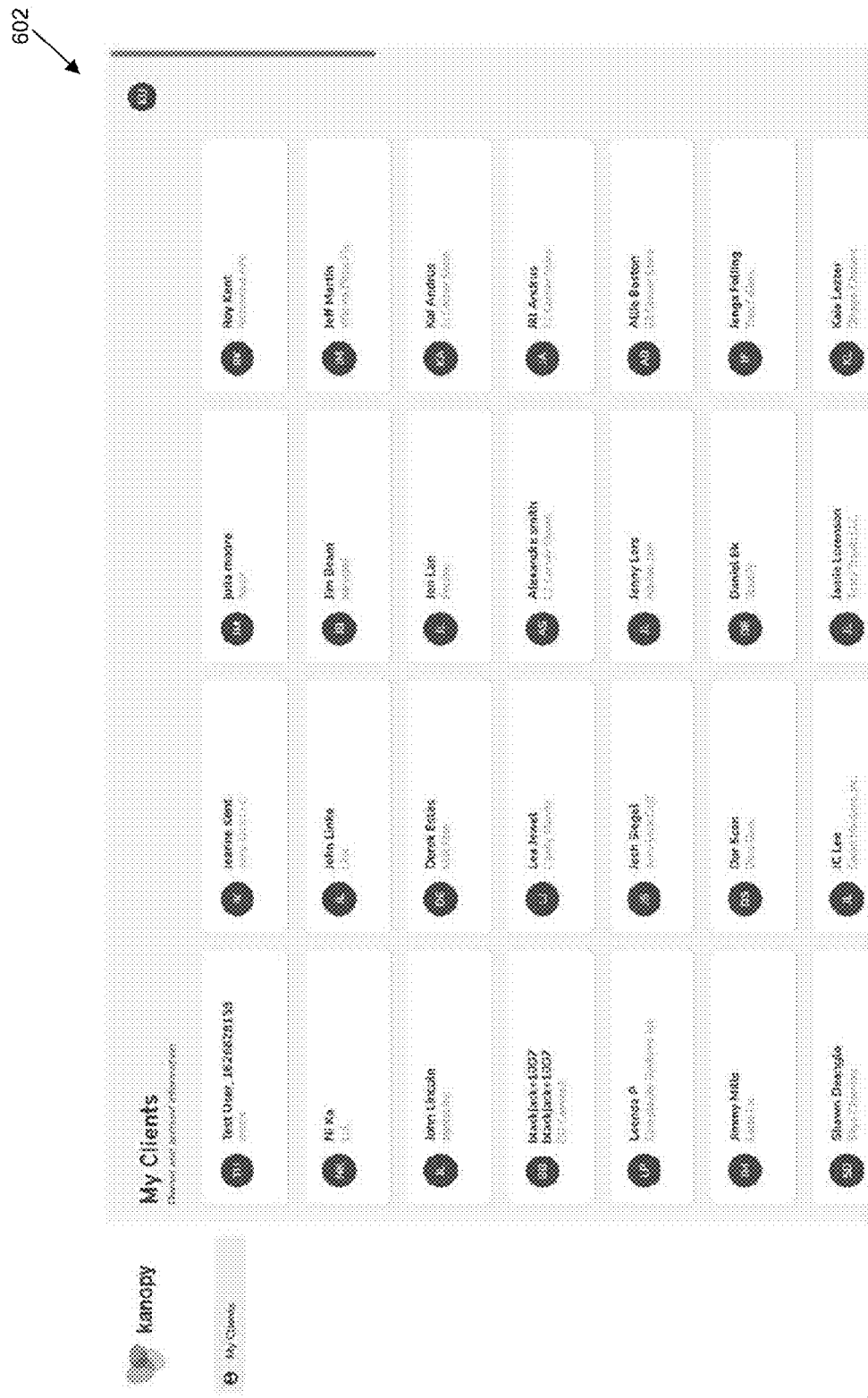
FIGS. 6A-E illustrate example user interfaces displayed by a predictive profiling platform to a second type of system.

FIG. 6A illustrates an interface 602 that indicates a plurality of requestor computing systems 106 mapped to the support organization computing system 104 at which the interface 602 is being provided. As discussed, the mappings represent real-world relationships between respective users; in the illustrated example, users of the requestor computing systems 106 are clients of the users at the support organization computing system 104. Via interface 602, a support organization user can select a specific requesting organization to see profile data and prediction data for the specific requesting organization.

Figure 6B:
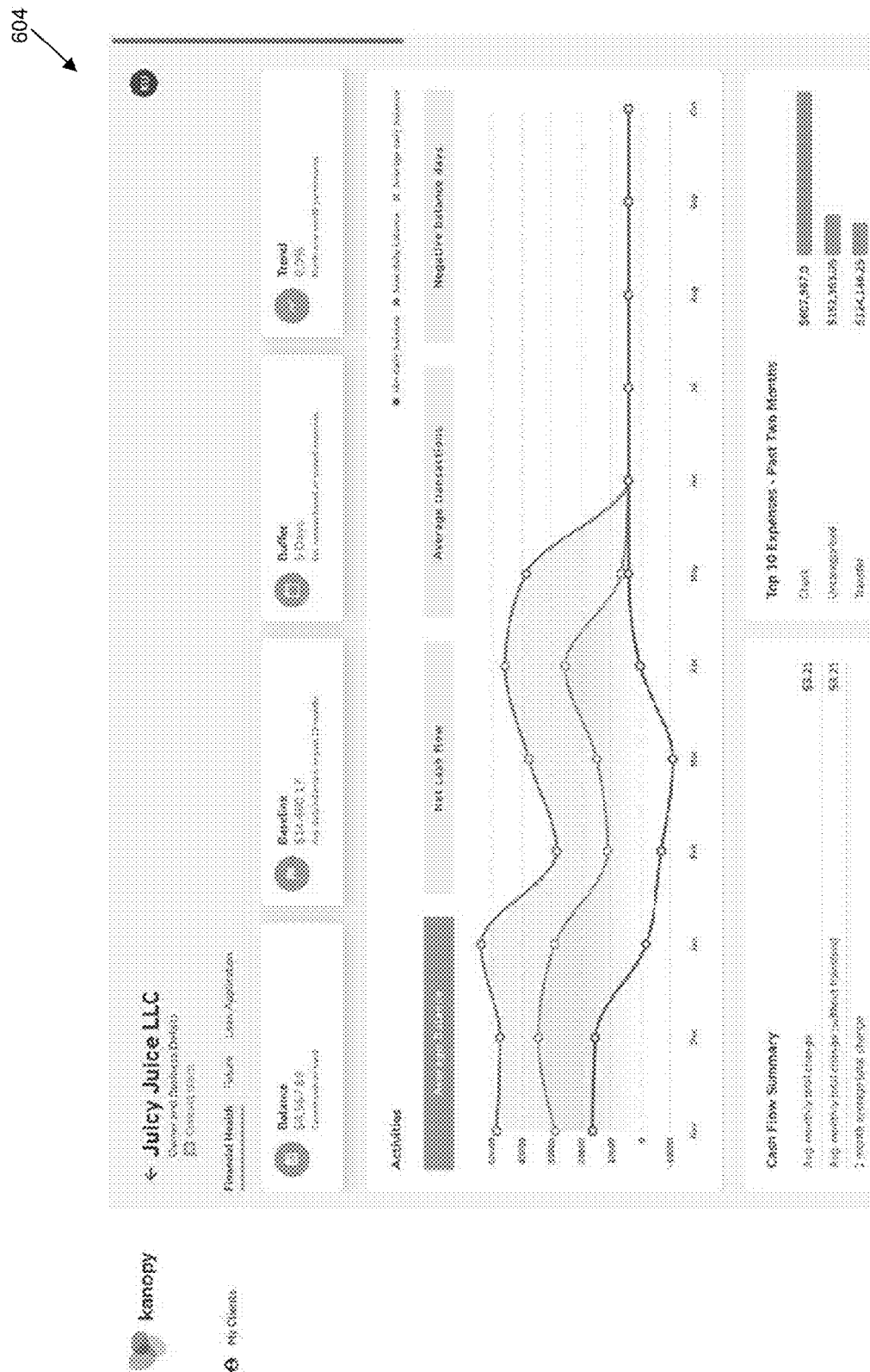

FIG. 6B illustrates an interface 604 that indicates, to a support organization user, profile data and prediction data of a selected requesting organization. The illustrated example of interface 604 corresponds to the illustrated example of interface 522 in FIG. 5K. In particular, the shared visibility provided by the platform 102 enables respective users to view the same or similar profile data and prediction data at interfaces 522 and 604 respectively. In some embodiments, interfaces 522 and 604 can be provided at separate computing systems at the same time, thereby improving operational efficiency by precluding a need for the separate computing systems to communicate directly with each other for the information shown in the respective interfaces.

Figure 6C:
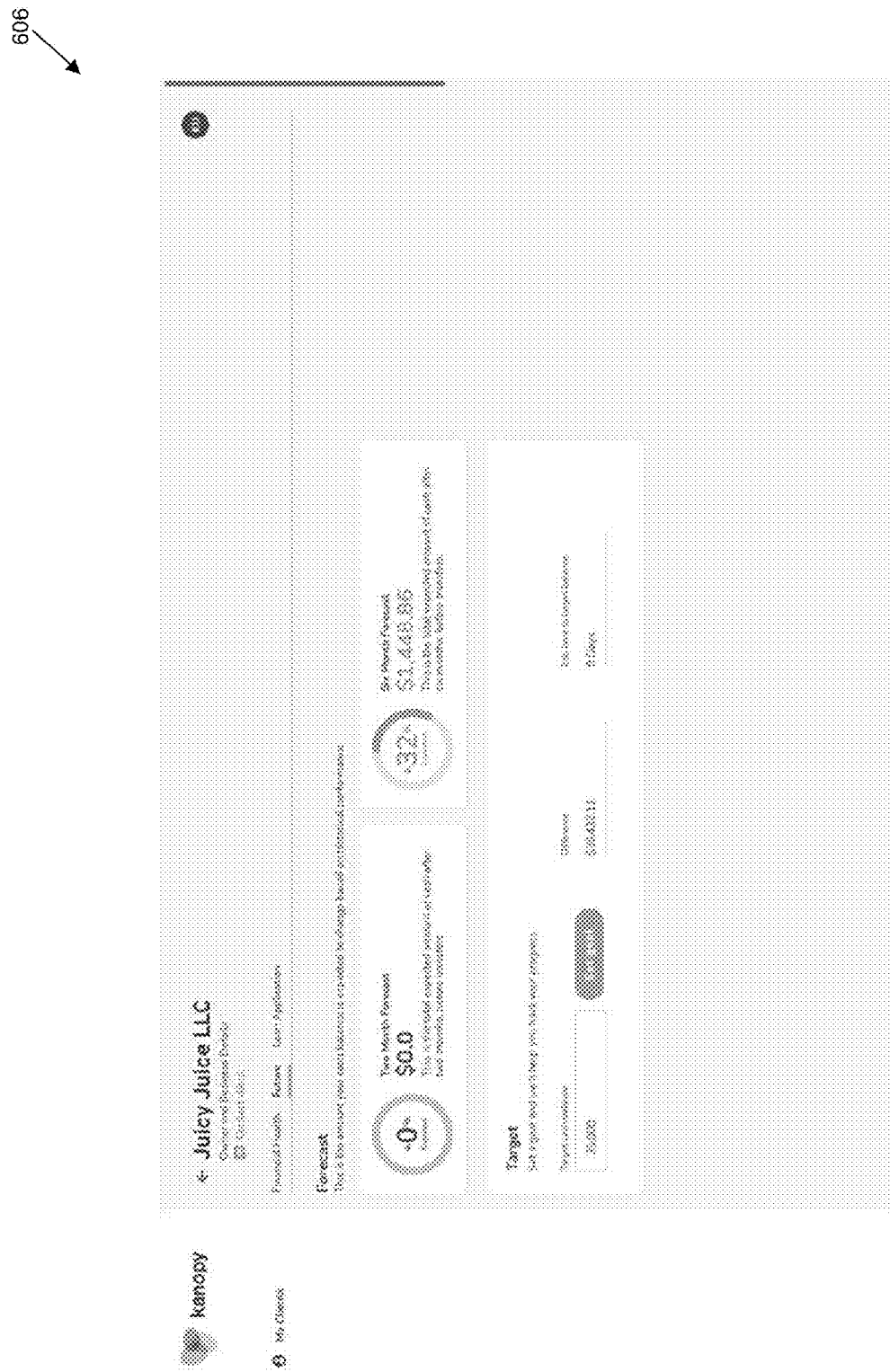

FIG. 6C illustrates an interface 606 that indicates, to a support organization user, prediction data of a selected requesting organization. The illustrated example of interface 606 corresponds to the illustrated example of interface 530 in FIG. 5O. In particular, the shared visibility provided by the platform 102 enables respective users to view the same or similar information at different computing systems. In interface 606, the support organization user can set future goals and targets for users of the selected requesting organization, and in some embodiments, definition of a future goal or target is transmitted to the requestor computing system 106 to be indicated to the requesting organization users.

Figure 6D:
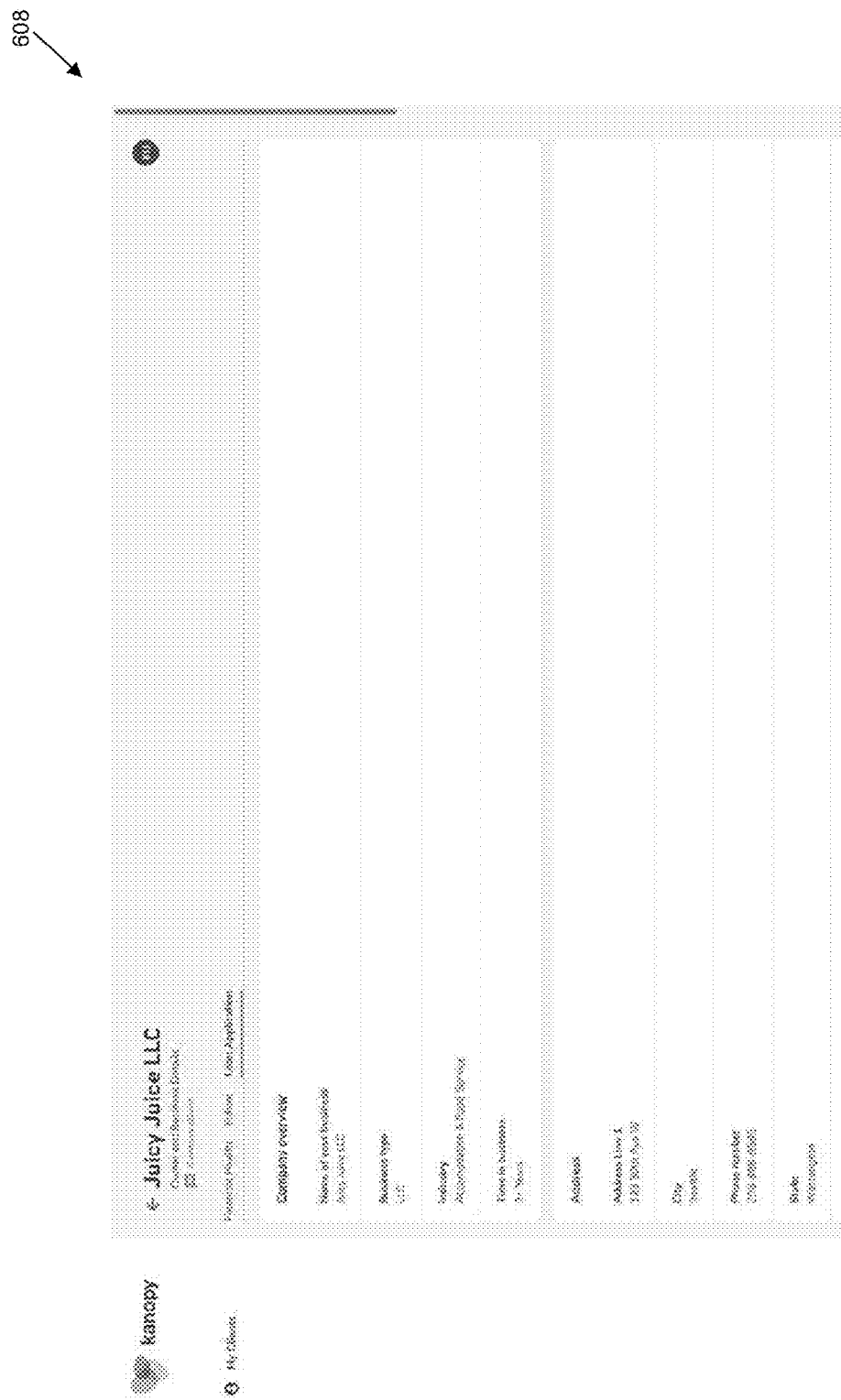
Figure 6E:
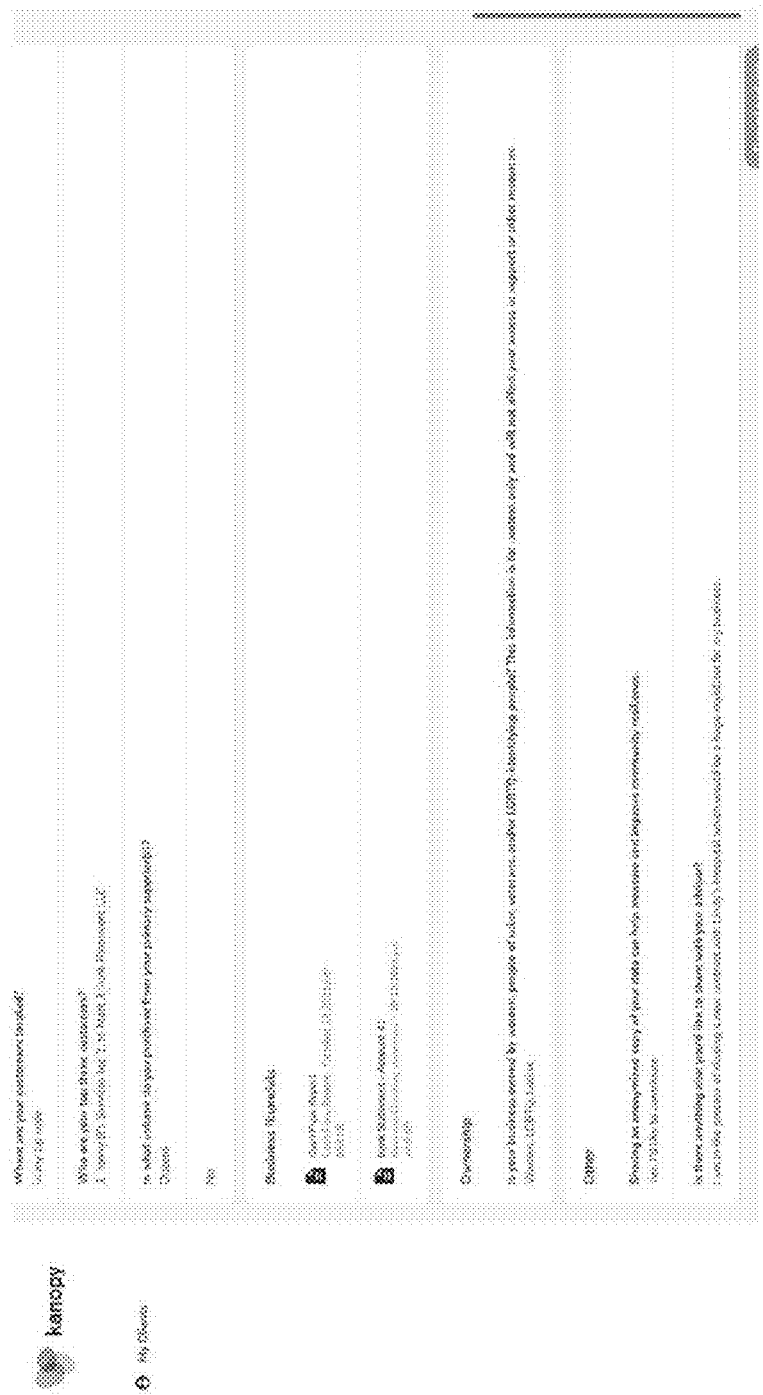

FIGS. 6D and 6E illustrate respective portions of an interface 608 in which multi-dimensional profile data of the selected requesting organization is indicated to a support organization user. The multi-dimensional profile data includes information provided by the requesting organization users in response to being requested for profile data.

V. Example Computer Systems

Figure 7:
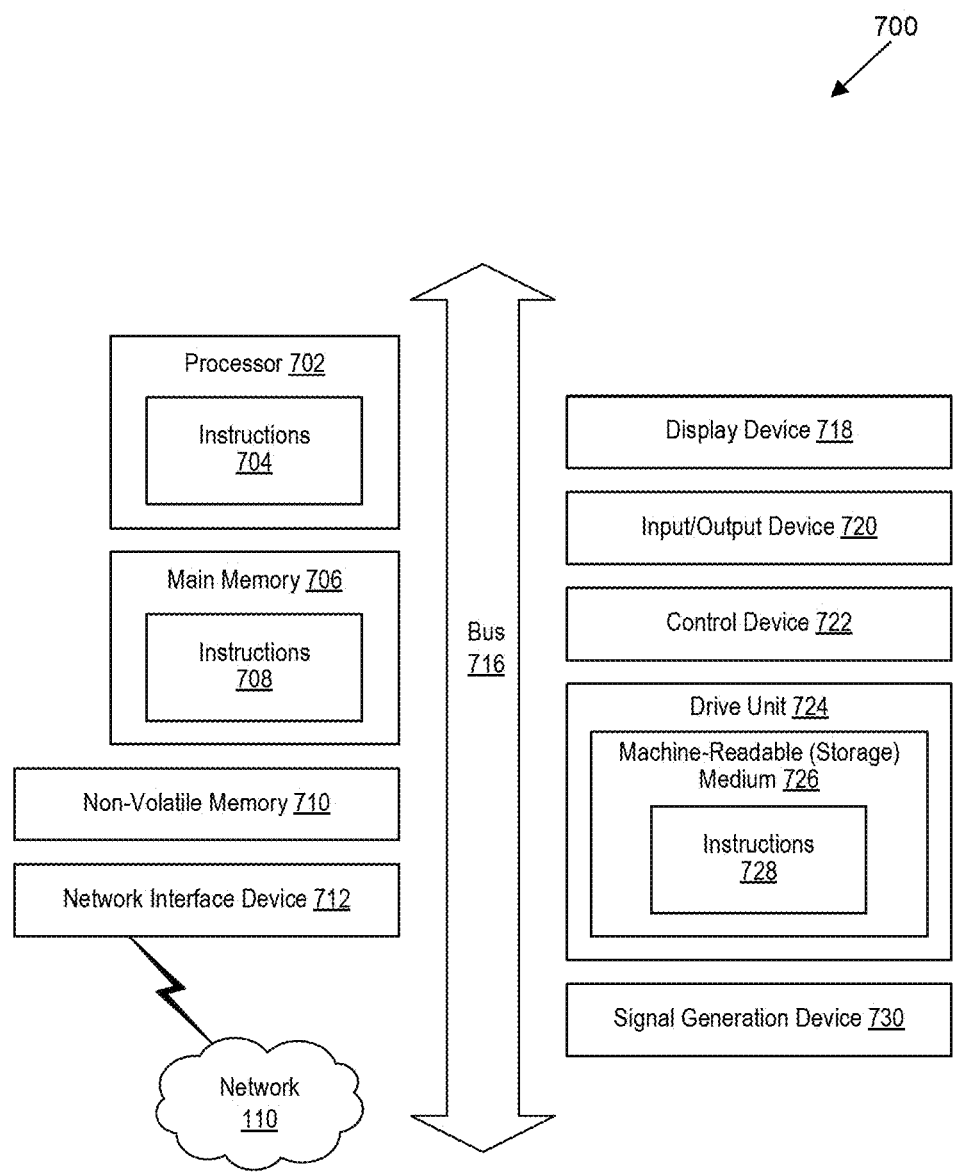
FIG. 7 illustrates a block diagram that shows an example of a computer system in which at least some embodiments described herein can be implemented.

FIG. 7 is a block diagram that illustrates an example of a computing system 700 in which at least some embodiments described herein can be implemented. For example, the predictive profiling platform 102 is implemented by one or more computing systems 700. For example, the predictive profiling platform 102 communicates and interacts with a support organization computing system 104 and requestor computing systems 106 that each are implemented by one or more computing systems 700. For example, the predictive profiling platform 102 retrieves contextual data from one or more external data systems 108 that are each implemented by one or more computing systems 700.

As shown, the computing system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computing system 700 is intended to illustrate a hardware device on which components illustrated or described relative to the examples of the figures and any other components described in this specification can be implemented.

The computing system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computing system 700 can be an embedded computer system, a system-on-chip (SOC), a single-board computer system (SBC) or a distributed system such as a mesh of computer systems or include one or more cloud components in one or more networks. Where appropriate, one or more computing systems 700 can perform operations in real-time, near real-time, or in batch mode.

The network interface device 712 enables the computing system 700 to mediate data in the network 110 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

VI. Remarks

The terms "example," "embodiment," and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

Implementations of the subject matter and the functional operations described in this patent document can be implemented in various systems, semiconductor devices, ultrasonic devices, digital electronic circuitry, or in computer software, firmware, or hardware, including the structures disclosed in this specification and their structural equivalents, or in combinations of one or more of them. Implementations of aspects of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming languages, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A computing system comprising at least one data processor and a memory storing instructions that, when executed by the at least one data processor, cause the computing system to:
   transmit, to a first device, a request for profile data that is configured to characterize a first group of users associated with the first device, the profile data spanning a plurality of dimensions;
   in response to receiving the profile data with respect to at least a first subset of the plurality of dimensions, generate and associate a device profile with the first device;
   define a mapping between the first device and a second device based on detecting a relationship between the first group of users and a second group of users associated with the second device;
   retrieve, from one or more external data systems, location-based contextual data related to the profile data with respect to a second subset of the plurality of dimensions;
   generate a predicted device profile that is configured to characterize the first group of users at a future point in time based at least on the device profile and the location-based contextual data;
   cause display of a first coordinated display interface at the first device and a second coordinated display interface at the second device according to the mapping,
     wherein each of the first coordinated display interface and the second coordinated display interface indicates the predicted device profile for the first device,
     wherein the first coordinated display interface includes a first set of user functions that are authorized for the first group of users at the first device,
     wherein the second coordinated display interface includes a second set of user functions that are authorized for the second group of users at the second device, and
     wherein both of the first coordinated display interface and the second coordinated display interface include a third set of user functions that are authorized for both the first group of users and the second group of users at respective devices; and
   execute a selected user function based on detecting user interaction with one of the first coordinated display interface at the first device or the second coordinated display interface at the second device.

2. The computing system of claim 1, wherein the instructions further cause the computing system to generate a mapping network in which a plurality of mappings between the second device and a plurality of other devices are defined.

3. The computing system of claim 1, wherein retrieving the location-based contextual data includes generating and transmitting an application programming interface (API) query to the one or more external data systems.

4. The computing system of claim 1, wherein the location-based contextual data includes respective device profiles associated with one or more other devices located within a pre-determined distance away from the first device.

5. The computing system of claim 1, wherein the second coordinated display interface provided at the second device indicates the predicted device profile for the first device in response to a selection of the first device in a listing of a plurality of devices mapped to the second device.

6. The computing system of claim 1, wherein the first set of user functions includes performing a matching operation between of the predicted device profile for the first device and respective device profiles associated with one or more other devices located within a pre-determined distance away from the first device.

7. At least one non-transitory computer-readable storage medium storing executable code that, when executed by at least one data processor, cause the at least one data processor to:

transmit, to a first device, a request for profile data that is configured to characterize a first group of users associated with the first device, the profile data spanning a plurality of dimensions;

in response to receiving the profile data with respect to at least a first subset of the plurality of dimensions, generate and associate a device profile with the first device;

define a mapping between the first device and a second device based on detecting a relationship between the first group of users and a second group of users associated with the second device;

retrieve, from one or more external data systems, location-based contextual data related to the profile data with respect to a second subset of the plurality of dimensions;

generate a predicted device profile that is configured to characterize the first group of users at a future point in time based at least on the device profile and the location-based contextual data;

cause display of a first coordinated display interface at the first device and a second coordinated display interface at the second device according to the mapping, wherein each of the first coordinated display interface and the second coordinated display interface indicates the predicted device profile for the first device, wherein the first coordinated display interface includes a first set of user functions that are authorized for the first group of users at the first device, wherein the second coordinated display interface includes a second set of user functions that are authorized for the second group of users at the second device, and wherein both of the first coordinated display interface and the second coordinated display interface include a third set of user functions that are authorized for both the first group of users and the second group of users at respective devices; and execute a selected user function based on detecting user interaction with one of the first coordinated display interface at the first device or the second coordinated display interface at the second device.

8. The at least one non-transitory computer-readable storage medium of claim 7, wherein the location-based contextual data includes respective device profiles associated with one or more other devices located within a pre-determined distance away from the first device.

9. A computer-implemented method for interfacing between a plurality of devices that are mapped to one another, the method comprising transmitting, by at least one processor of a system, a request for profile data to a first device, the profile data configured to characterize a first group of users associated with the first device and spanning a plurality of dimensions;

in response to receiving the profile data with respect to at least a first subset of the plurality of dimensions, generating and associating, by the at least one processor, a device profile with the first device;

defining, by the at least one processor, a mapping between the first device and a second device based on detecting a relationship between the first group of users and a second group of users associated with the second device;

retrieving, by the at least one processor from one or more external data systems, location-based contextual data related to the profile data with respect to a second subset of the plurality of dimensions;

generating, by the at least one processor, a predicted device profile that is configured to characterize the first group of users at a future point in time based at least on the device profile and the location-based contextual data;

causing, by the at least one processor, display of a first coordinated display interface at the first device and a second coordinated display interface at the second device according to the mapping, wherein each of the first coordinated display interface and the second coordinated display interface indicates the predicted device profile for the first device, wherein the first coordinated display interface includes a first set of user functions that are authorized for the first group of users at the first device, wherein the second coordinated display interface includes a second set of user functions that are authorized for the second group of users at the second device, and wherein both of the first coordinated display interface and the second coordinated display interface include a third set of user functions that are authorized for both the first group of users and the second group of users at respective devices; and executing, by the at least one processor, a selected user function based on detecting user interaction with one of the first coordinated display interface at the first device or the second coordinated display interface at the second device.

10. The computer-implemented method of claim 9, further comprising:

generating a mapping network in which a plurality of mappings between the second device and a plurality of other device are defined.

11. The computer-implemented method of claim 9, further comprising:

generating and transmitting an application programming interface (API) query to the one or more external data systems to retrieve the location-based contextual data.

12. The computer-implemented method of claim 9, wherein the location-based contextual data includes respective device profiles associated with one or more other devices located within a pre-determined distance away from the first device.

13. The computer-implemented method of claim 9, wherein the second coordinated display interface provided at the second device indicates the predicted device profile for the first device in response to a selection of the first device in a listing of a plurality of devices mapped to the second device.

14. The computer-implemented method of claim 9, wherein the third set of user functions includes causing display of a comparison of the predicted device profile and respective device profiles associated with one or more other devices located within a pre-determined distance away from the first device.

15. The computer-implemented method of claim 9, wherein the first set of user functions includes:

identifying one or more other devices that are located within a pre-determined distance away from the first device and that are associated with respective device profiles that are correlated with the predicted device profile based on performing a profile matching operation;

transmitting an invitation request to a third device of the one or more other devices; and defining a second mapping between the first device and the third device in response to detecting user input accepting the invitation request at the third device.

16. The computer-implemented method of claim 9, further comprising automatically causing indication of an alert at each of the first device and the second device in response to the predicted device profile for the first device satisfying a pre-determined threshold with respect to a particular dimension of the plurality of dimensions.

17. The computer-implemented method of claim 9, further comprising associating a priority measure with the predicted device profile for the first device, and wherein the priority measure associated with the predicted device profile is indicated via the second coordinated display interface to the second group of users.

18. The computer-implemented method of claim 17, wherein the first coordinated display interface is prevented from indicating the priority measure associated with the predicted device profile for the first device.

19. The computer-implemented method of claim 9, wherein the relationship between the first group of users and the second group of users is detected based on a request that is transmitted from the first device to the second device and that identifies the second group of users.

20. The computer-implemented method of claim 9, wherein the relationship between the first group of users and the second group of users is detected based on parsing a text-based document that indicates the relationship between the first group of users and the second group of users.

\* \* \* \* \*